US012789620B2

(12) United States Patent
Sweer et al.

(10) Patent No.: US 12,789,620 B2
(45) Date of Patent: Nov. 10, 2026

(54) SELF-CONTAINED FUELING STATION

(71) Applicant: Raytheon Company, Arlington, VA (US)

(72) Inventors: Grant A. Sweer, Owens Cross Roads, AL (US); Christopher P. Owan, Tucson, AZ (US); Shawn P. Burke, Omaha, NE (US); Zachary M. Swanson, Tucson, AZ (US); Paul A. Merems, Tucson, AZ (US)

(73) Assignee: Raytheon Company, Arlington, VA (US)

( * ) Notice: Subject to any disclaimer, the term of this patent is extended or adjusted under 35 U.S.C. 154(b) by 68 days.

(21) Appl. No.: 18/774,450

(22) Filed: Jul. 16, 2024

(65) Prior Publication Data

US 2026/0021697 A1 Jan. 22, 2026

(51) Int. Cl.

| | |
|---|---|
| ***B64U 20/40*** | (2023.01) |
| ***B60K 15/035*** | (2006.01) |
| ***B60K 15/077*** | (2006.01) |
| *B60K 15/03* | (2006.01) |
| *B64D 37/06* | (2006.01) |

(52) U.S. Cl.

CPC ...... *B60K 15/077* (2013.01); *B60K 15/03519* (2013.01); *B60K 2015/03138* (2013.01); *B60K 2015/03144* (2013.01); *B64D 37/06* (2013.01); *B64U 20/40* (2023.01)

(58) Field of Classification Search

CPC ............ B60K 15/077; B60K 15/03519; B60K 2015/03138; B60K 2015/03144; B64F 1/28; B64D 37/00–34; B64D 2037/325; B64D 37/10; B64D 37/12; B64U 20/40

USPC ......... 137/571–576, 565.01, 565.11, 565.15, 137/565.13, 565.17, 1.8–1.82; 244/135 R, 244/135 A, 135 B, 135 C

See application file for complete search history.

(56) References Cited

U.S. PATENT DOCUMENTS 1,680,245 A * 8/1928 Penn ...................... F04B 49/02 137/565.13

2,700,337 A 1/1955 Cumming (Continued)

FOREIGN PATENT DOCUMENTS

CN 101680999 B 5/2012

DE 2717297 10/1978

(Continued)

OTHER PUBLICATIONS

"U.S. Appl. No. 18/774,415, Non Final Office Action mailed May 19, 2025", 13 pgs.

(Continued)

*Primary Examiner* — Craig J Price

(74) *Attorney, Agent, or Firm* — Schwegman Lundberg & Woessner, P.A.

(57) ABSTRACT

A self-contained fueling station is paired with an external fuel tank and configured to transfer liquid fuel back-and-forth to maintain a storage pressure in the external fuel tank, increase to an operational pressure and return to the storage pressure. The fueling station is equipped with an internal fuel tank with a fuel expansion accumulator and float valve, a bi-directional pump and multiple relief valves to transfer liquid fuel and maintain the desired pressure. The external fuel tank may be a fixed volume or an expandable volume.

19 Claims, 22 Drawing Sheets

(56) References Cited

U.S. PATENT DOCUMENTS

| | | | | |
|---|---|---|---|---|
| 2,884,291 | A | | 4/1959 | Whitten |
| 2,935,946 | A | | 5/1960 | Gallo et al. |
| 2,953,156 | A | * | 9/1960 | Bryant ................. F02M 37/025 417/163 |
| 2,962,330 | A | | 11/1960 | John |
| 3,540,745 | A | | 11/1970 | Flock |
| 3,953,213 | A | | 4/1976 | Gasper |
| 4,089,533 | A | | 5/1978 | Knudson |
| 4,572,463 | A | | 2/1986 | Ashkenazi |
| 4,601,235 | A | | 7/1986 | Roberts |
| 4,714,008 | A | | 12/1987 | Bowers |
| 4,944,226 | A | | 7/1990 | Wedertz et al. |
| 5,078,175 | A | | 1/1992 | Martin et al. |
| 5,094,140 | A | | 3/1992 | Williams |
| 5,889,226 | A | | 3/1999 | Giesenberg et al. |
| 7,194,853 | B1 | | 3/2007 | Knight |
| 7,506,570 | B1 | | 3/2009 | Koski |
| 7,992,483 | B2 | | 8/2011 | Tseng |
| 8,887,613 | B1 | | 11/2014 | Griffin et al. |
| 9,752,682 | B2 | | 9/2017 | Winkelmann et al. |
| 10,247,307 | B2 | | 4/2019 | Foster |
| 10,422,612 | B2 | | 9/2019 | Osdon et al. |
| 10,518,759 | B2 | | 12/2019 | Osterberg et al. |
| 10,520,136 | B2 | * | 12/2019 | Johnson .................... F17C 5/02 |
| 10,801,622 | B2 | | 10/2020 | Foster |
| 11,014,445 | B2 | * | 5/2021 | Hoover .................. B60K 15/03 |
| 11,279,225 | B2 | * | 3/2022 | Newlin ................ F02M 37/106 |
| 11,613,377 | B2 | * | 3/2023 | Pitman ................... B64D 39/02 244/135 A |
| 11,796,291 | B2 | | 10/2023 | Merems et al. |
| 11,852,447 | B2 | | 12/2023 | Barrett et al. |
| 11,981,454 | B2 | * | 5/2024 | Hageman ................. B67D 7/14 |
| 2002/0170617 | A1 | * | 11/2002 | Veenstra ................. F17C 5/007 141/94 |
| 2007/0052181 | A1 | | 3/2007 | Nakamura |
| 2007/0205561 | A1 | | 9/2007 | Emoto et al. |
| 2009/0205311 | A1 | | 8/2009 | Bulman et al. |
| 2011/0265637 | A1 | | 11/2011 | Hainze et al. |
| 2016/0305423 | A1 | | 10/2016 | Walters |
| 2016/0362195 | A1 | * | 12/2016 | Wilkinson ............... B67D 7/04 |
| 2017/0175899 | A1 | | 6/2017 | Lee et al. |
| 2017/0226026 | A1 | | 8/2017 | Jones |
| 2018/0149176 | A1 | | 5/2018 | Sueyoshi et al. |
| 2020/0148399 | A1 | | 5/2020 | De Jong et al. |
| 2021/0340837 | A1 | | 11/2021 | Fox et al. |
| 2023/0193856 | A1 | | 6/2023 | Johansen et al. |

FOREIGN PATENT DOCUMENTS

| | | |
|---|---|---|
| JP | 2019152233 | 9/2019 |
| KR | 20230029715 | 3/2023 |

OTHER PUBLICATIONS

"U.S. Appl. No. 18/774,380, Non Final Office Action mailed Jul. 8, 2025", 8 pgs.

"U.S. Appl. No. 18/774,327, Notice of Allowance mailed Jun. 25, 2026", 8 pgs.

* cited by examiner

SELF-CONTAINED FUELING STATION

BACKGROUND

Field

This disclosure relates to effectors such as ground, tube or air launched munitions including missiles, submunitions, UAVs or drones, and more particularly to a self-contained fueling station that is paired with the effector.

Description of the Related Art

Effectors such as ground, sea, tube or air launched munitions such as missiles, submunitions, UAVs or drones must be transported, stored and launched in and from existing infrastructure including storage containers, shipping containers, launch tubes/canisters, transport vehicles or aircraft. The existing infrastructure creates a limitation on the effector's length and its fuel capacity, which affects the effector's aerodynamic performance and range. Retrofitting or replacing the infrastructure to accommodate longer effectors is cost prohibitive.

SUMMARY

The following is a summary that provides a basic understanding of some aspects of the disclosure. This summary is not intended to identify key or critical elements of the disclosure or to delineate the scope of the disclosure. Its sole purpose is to present some concepts of the disclosure in a simplified form as a prelude to the more detailed description and the defining claims that are presented later.

The present disclosure provides an expandable fuel volume within an effector. The transfer of liquid fuel from an external source to the effector both expands the fuel volume axially and moves a module positioned forward or aft of the fuel volume axially to extend the length of the effector. This serves both to improve the aerodynamics of the effector and its range without requiring retrofitting or replacement of the storage, transport or launch platform infrastructure.

In different embodiments, the effector may be a munition such as ground, tube or air launched munitions such as missiles, submunitions, UAVs or drones. The airframe may be, for example, the main body, wing or rotor of the munition. The module may, for example, in the case of a missile be a nose or payload module positioned forward of the fuel volume or a solid fuel booster module or tail module positioned aft of the module. The module may be a wing section of a UAV or a rotor section of a drone.

In different embodiments, the expandable fuel volume may be provided by telescoping cylindrical sections of the airframe or a piston (the module) and a stationary cylindrical section of the airframe. The cylindrical sections may be nested to extend more than once. In either configuration, a bellows fuel bladder may be positioned in the fuel volume to expand as it is filled with liquid fuel with the translating cylindrical section or piston. A bellows pressure bladder may be positioned between the bellows fuel bladder and the module to expand as the bellows fuel bladder contracts as fuel is consumed in flight.

In different embodiments, the external source of liquid fuel may be a self-contained fueling station that is paired with the effector. The fuel station may be separated from the effector prior to launch, immediately at launch or carried with the effector and discarded shortly after launch.

In an embodiment, the self-contained fueling station maintains the unexpanded fuel volume at a low storage pressure (e.g., 5-10 psi), preferably at 100% fuel (no air bubbles). Pre-launch the fueling station transfers liquid fuel to expand the effectors fuel volume and raise the pressure to a high launch pressure (e.g., 100-150 psi). The operational pressure is at least 10× the storage pressure.

In an embodiment, the self-contained fueling station is configured to upon receipt of an abort command to transfer liquid fuel back to its internal tank to retract the expandable fuel volume and module back into the airframe and return the fuel volume to the storage pressure.

In an embodiment, the self-contained fueling station includes an internal fuel tank configured to hold liquid fuel and a fuel line for transferring liquid fuel to and from the effector's expandable fuel volume, a bi-directional valve coupled between the internal fuel tank and the fuel line, a fuel expansion accumulator inside the internal fuel tank to maintain a storage pressure within the expandable fuel volume when the bi-directional valve is on in a stowed state and a bi-directional pump positioned between the internal fuel tank and fuel line to transfer liquid fuel to and from the effector. Deploy and stow unidirectional relief valves are connected in opposing flow directions between the internal fuel tank and the fuel line. The deploy unidirectional relief valve turns on when the pressure in the effector's expandable fuel volume exceeds an operational pressure range during or after transfer of liquid fuel to the expandable fuel volume to protect the effector and turn off the pump. The stow unidirectional relieve valve turns on when pressure in the expandable fuel volume reaches the storage pressure during transfer of liquid fuel back to the internal tank to protect the internal tank, turn off the pump and re-open the bi-directional valve to maintain the storage pressure.

These and other features and advantages of the disclosure will be apparent to those skilled in the art from the following detailed description of preferred embodiments, taken together with the accompanying drawings, in which:

DETAILED DESCRIPTION

Figure 1A:
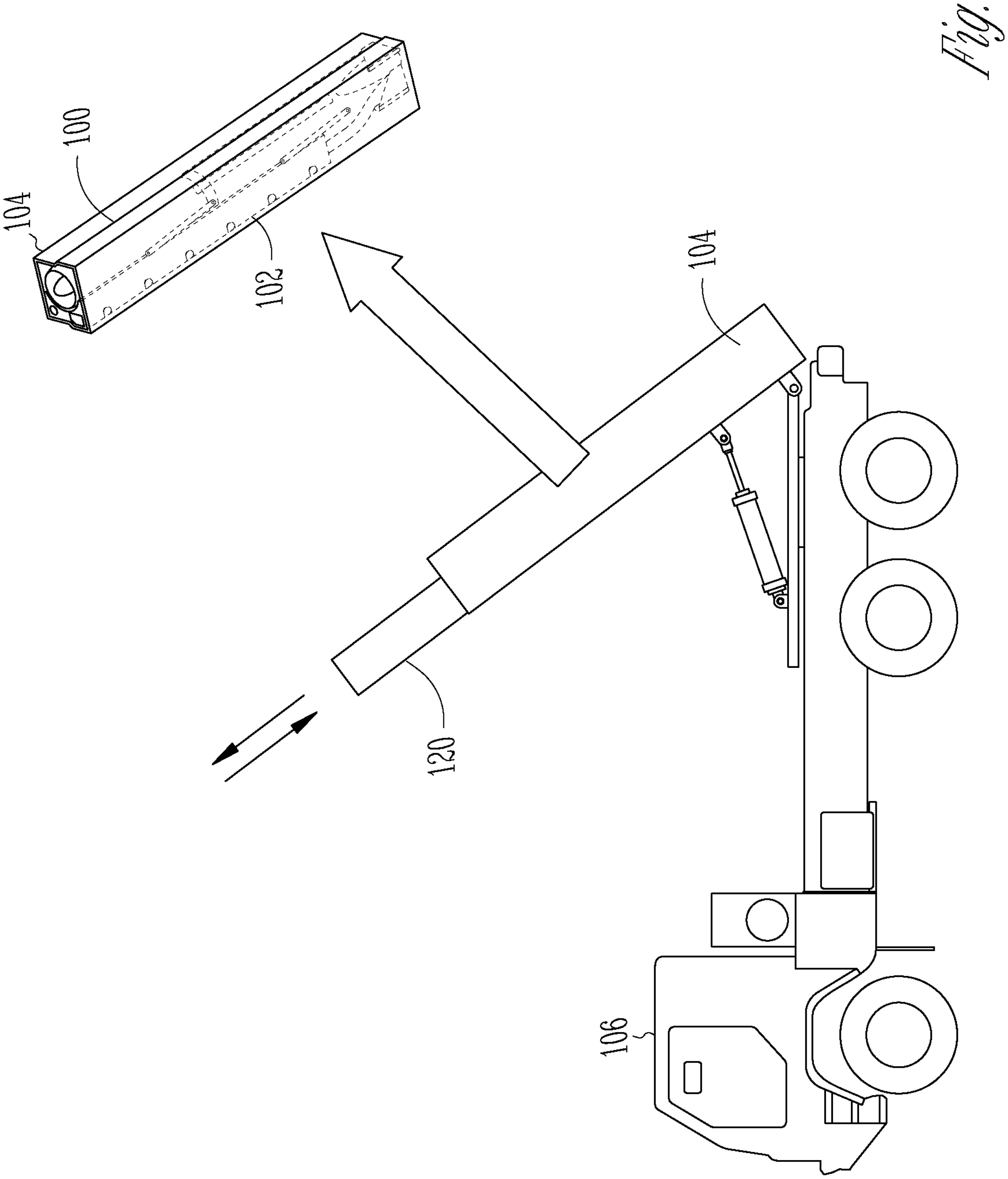
FIGS. 1A-1B are illustrations of a tube-launched liquid filled extending missile that is paired with an external discardable self-contained fueling station.
Figure 1B:
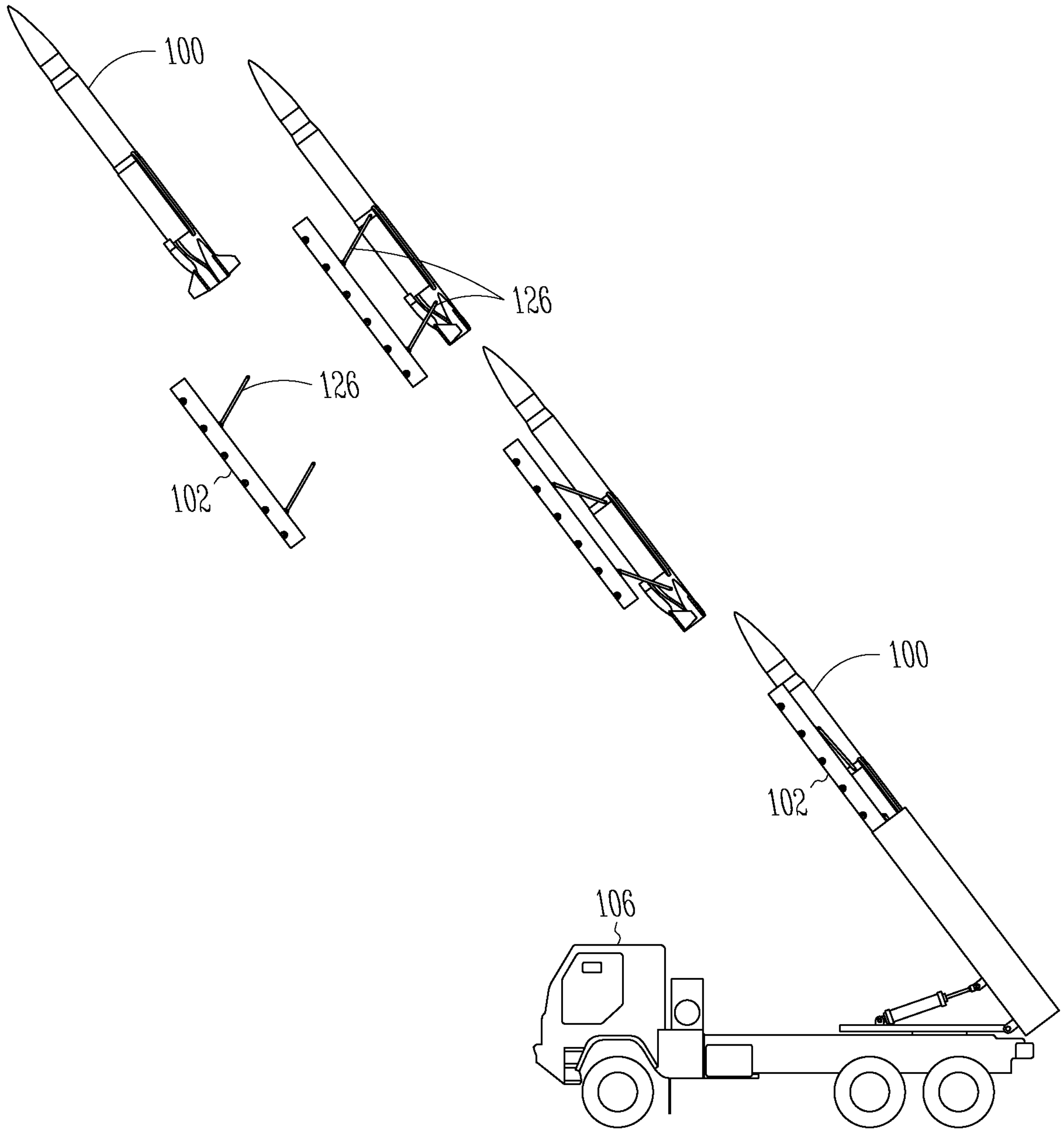
Figure 2A:
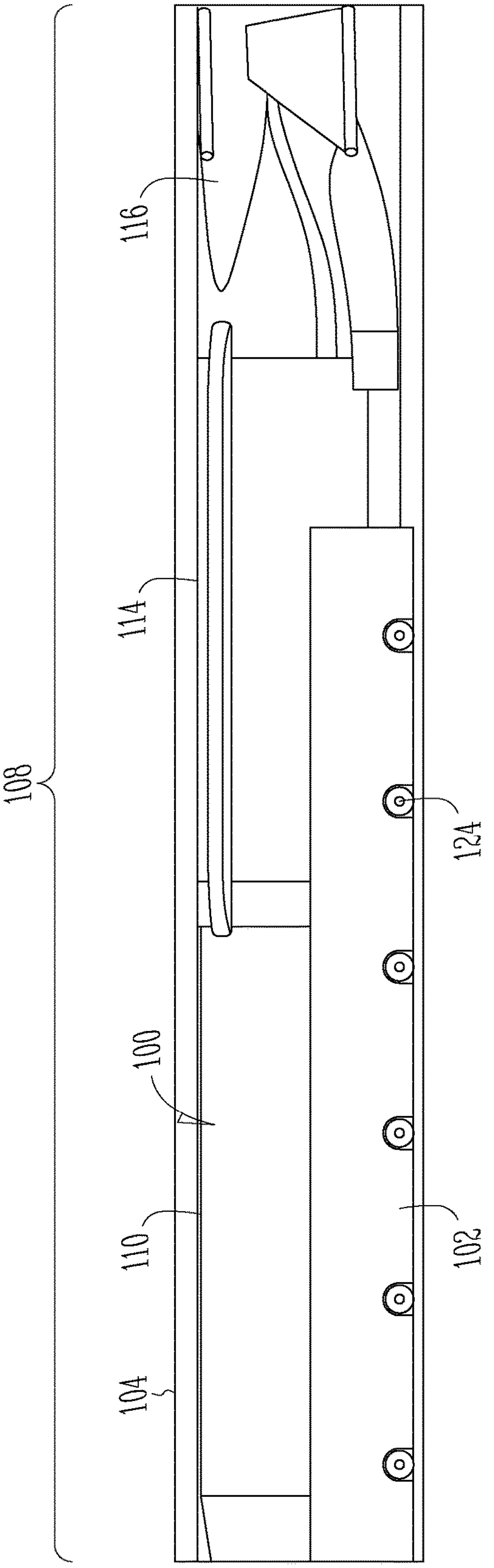
FIGS. 2A-2B are side and section view of the extending missile in its stowed configuration.
Figure 2B:
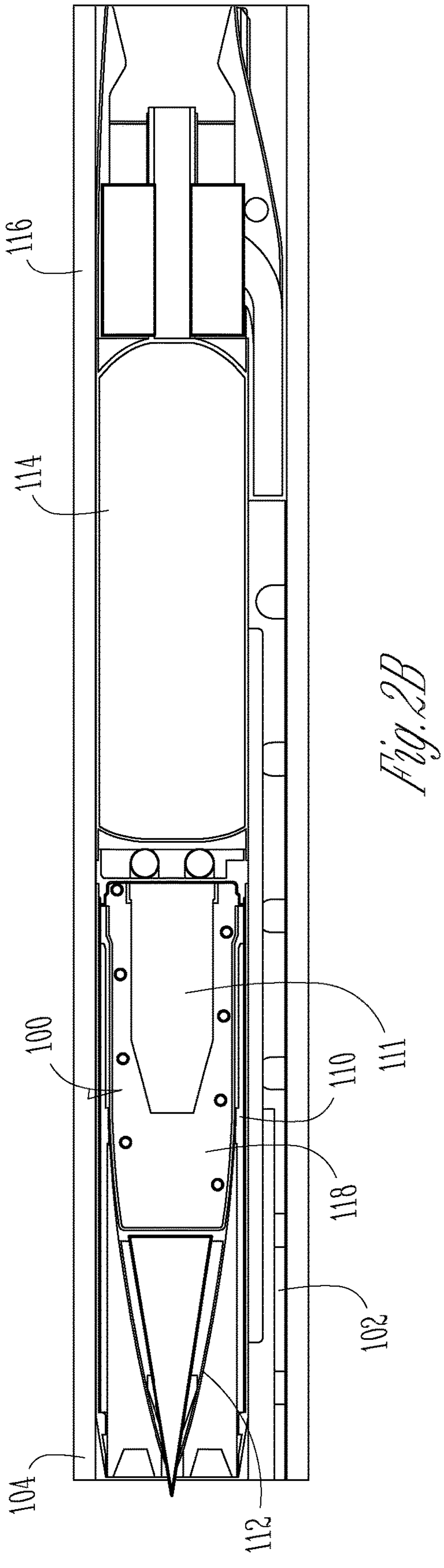
Figure 3A:
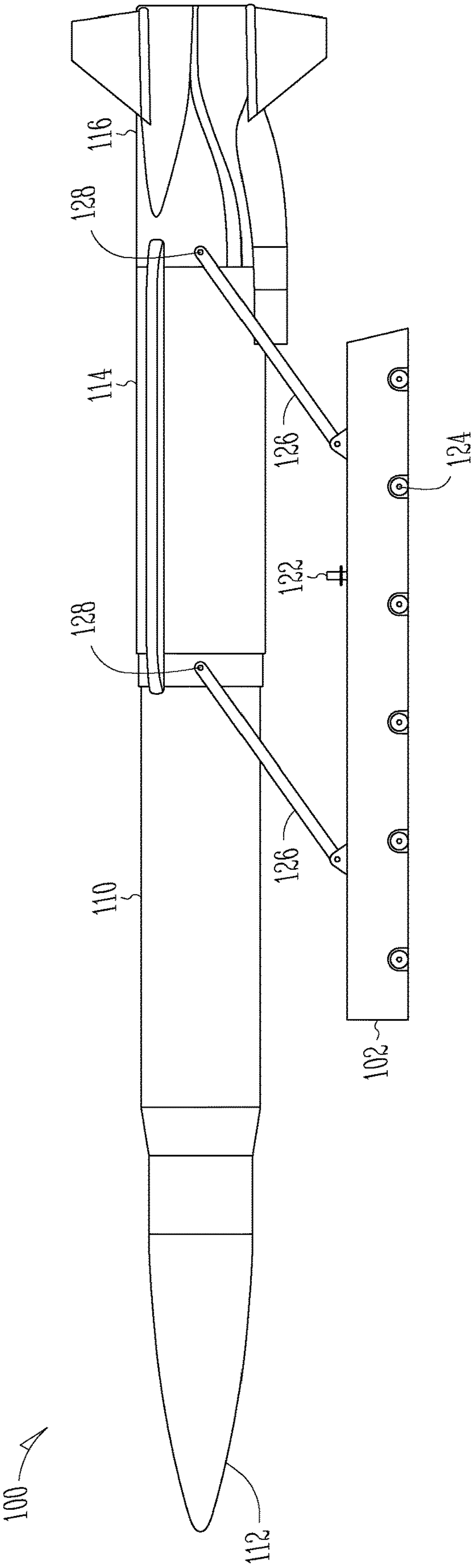
FIGS. 3A-3B are side and section view of the extending missile in its extended configuration.
Figure 3B:
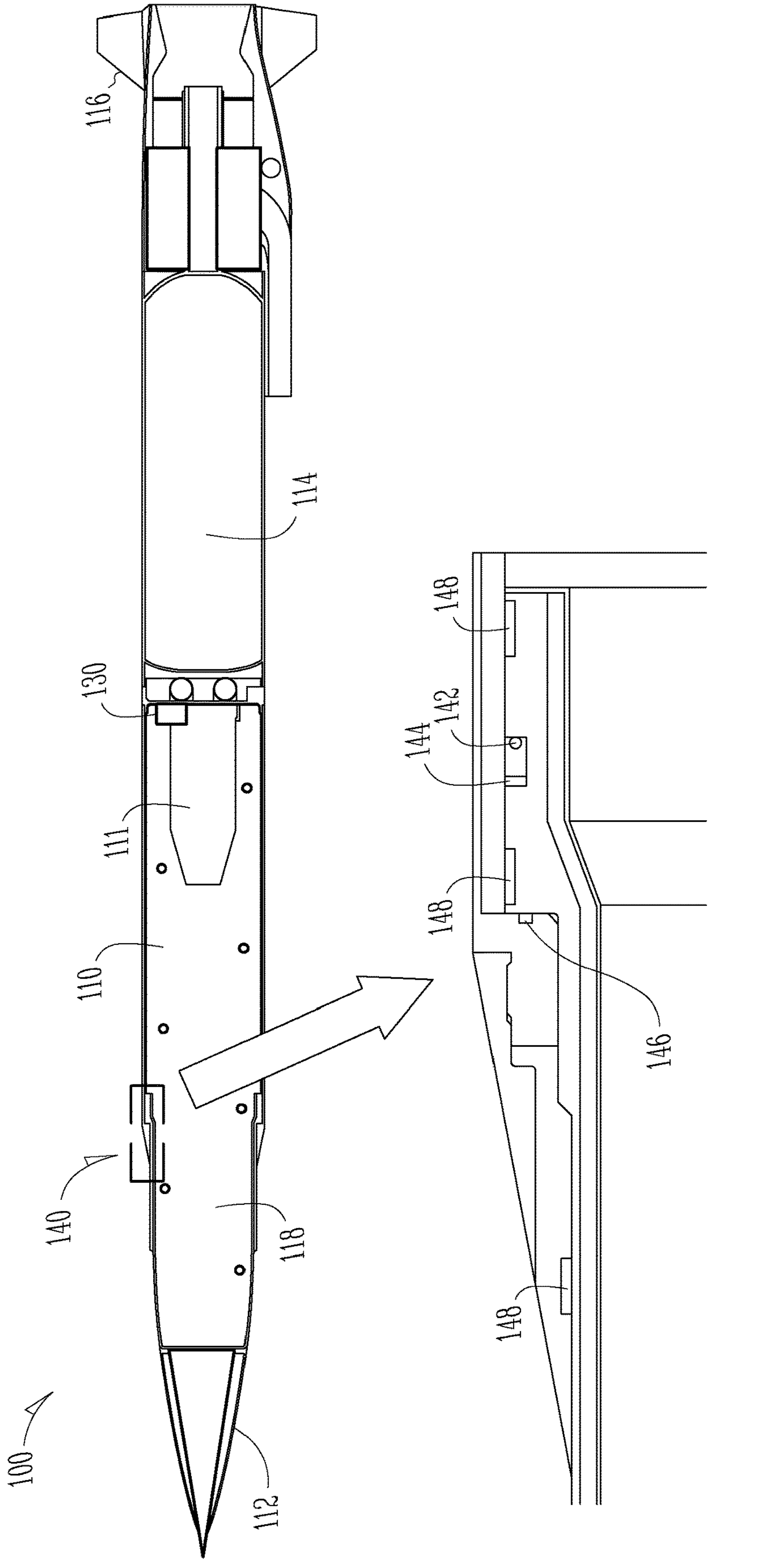

The present disclosure provides an expandable fuel volume within an airframe. The transfer of liquid fuel from an external source to the airframe both expands the fuel volume axially and moves a module positioned forward or aft of the fuel volume axially to extend the length of the effector. This serves both to improve the aerodynamics of the effector and its range without requiring retrofitting or replacement of the storage, transport or launch platform infrastructure. The effector may be a munition such as ground, tube or air launched munitions such as missiles, submunitions, UAVs or drones. The airframe may be, for example, the main body, wing or rotor of the munition.

Without loss of generality the liquid fueled extending effector will be described in the context of a tube-launched missile that is paired with a self-contained fueling station that is launched with the missile and discarded once it clears the tube. In this example, the "module" is a nose section that includes a portion of the fuel tank and the guidance system optics and electronics and is positioned forward of the expandable fuel volume.

Referring now to FIGS. 1A-1B, 2A-2B and 3A-3B, an embodiment of a tube-launched extending missile includes a missile 100 that is paired with a self-contained fueling station 102 and stowed in a canister 104 for transportation, storage, handling and launch from a mobile ground-based platform 106. Missile 100 includes an airframe 108, which is made up of a fixed mid-body section 110 (e.g., a payload 111) a translating nose section 112 that is stowed in the fixed mid-body section 110, a fixed solid rocket motor 114 and an aft section 116 (e.g. the inlet, engine, control actuation system, etc.).

In the stowed position, a fuel volume 118, which provides an external fuel tank, is defined within the translating nose section 114. The self-contained fueling station 102 suitably holds the fuel volume 118 at 100% liquid fuel at a low storage pressure of approximately 5-10 psi. To prepare for launch, self-contained fueling station 102 transfers liquid fuel to the missile's fuel volume 118, which pushes translating nose section 112 forward until it reaches an extended EOT. This has both the desired effect of expanding fuel volume 118 to accept more liquid fuel, thus extending the range of the missile, and of extending the length of missile 100 thereby improving its aerodynamics in flight. A sabot 120 that covers translating nose section 114 is removed just prior to launch. If the launch is aborted, translating nose section 112 retracts into fixed mid-body section 110 to its stowed position. The liquid fuel is transferred back to self-contained fueling station 102. In this exemplary configuration, gravity is sufficient to retract the translating nose section 114 and transfer the liquid fuel back to the fueling station 102.

In this embodiment, self-contained fueling station 102 is carried with missile 100 at launch until it clears canister 104. Self-contained fueling station 102 is configured to cradle missile 100 to minimize volume in the canister and includes a quick-release coupler 122 to transfer liquid fuel to and from missile 100, a roller system 124 (e.g., wheels) to facilitate ejection from the canister 104, and a plurality of push rods 126 that are configured to push the fueling station 102 out of the canister 104 and then rotate the fueling station 102 away from the missile responsive to aerodynamic drag and to release once the fueling station 102 clears the canister. A hinge 128 on the missile 100 is configured to allow the push rods 106 to rotate and then release at a specified angle.

The extending missile extends and retracts by using liquid fuel pressure (provided by the self-contained fueling station 102) to produce a force sufficient to translate the nose section 114 axially to push open a canister cover and uses a fraction of that force to stow the nose section 114 by just the force of the weight of nose section 114 while the liquid fuel is being pumped out of the fuel volume. Liquid fuel filled missiles have air pockets that allow the thermal expansion differential between the liquid fuel and the airframe over storage temperature ranges to control over pressure conditions that would fail the airframe. A fuel pressure increase in the stowed position, could cause the nose section to translate forward and push off the canister cover prematurely. A trigger lock 130 is configured to produce a high retention force to hold the nose section 114 in place until the liquid fuel is transferred to increase the pressure to produce sufficient force to overcome the trigger lock 130 and allow the nose section 114 to translate. The trigger lock 130 is also configured to allow the nose section 114 to retract and reset the trigger lock with a small reset force.

Extending missiles driven by expandable fuel volumes require that the liquid fuel stored in the fuel volume not leak into the launch canister over a storage life of the system through storage temperature extremes. During flight, the extending missile 100 must remain sealed while exposed to extremely high temperatures over a time of flight of the missile with a minimal leakage rate. Extending missile 100 is provided with a scaling system 140 that must meet these criteria during storage, axially dynamic airframe extension and retraction and flight. The sealing system should support the translating section with a radial load without scoring the surface, degrading its scaling capability or galling solid mid-travel.

Scaling system 140 includes a piston seal 142 typically formed of a polymer material such as fiberglass filled PTFE, which may for example be rated at −60° F. to 575° F. The piston seal 142 is likely sufficient for storage and extension/retraction. However, during flight the airframe may be exposed to temperatures substantially above 575° F. for several minutes. This may cause the piston seal 142 to liquify and leak, allowing the pressurized fuel to leak. To address this issue, a backer seal 144 is positioned forward of piston seal 142. Backer seal 144 suitably includes a pair of opposing wedge-shaped backup rings. Pressure on the piston seal 142 is converted into a force that drives the pair of opposing wedge-shaped backup rings axially together against a wedge angle, which drives the pair of wedge-shaped backup rings radially apart to close a gap between the translating nose section 114 and the fixed mid-body section 112. This produces a "tortuous path" that restricts the liquefied polymer material from flowing. In case the liquified polymer material makes it through the tortuous path, a metal face seal 146 is positioned at an extended EOT stop to prevent the liquified polymer material, and pressurized liquid fuel, from leaking out. A plurality of glide seals 148 are positioned between the translating nose section 114 and fixed mid-body section 112 to prevent degrading the metal surfaces and galling.

In different embodiments, the expandable fuel volume may be provided by telescoping cylindrical sections of the airframe or a piston (the module) and a stationary cylindrical section of the airframe. The translating section may be positioned forward such as the nose section or aft such as the solid fuel motor. The cylindrical sections may be nested to extend more than once. In either configuration, a bellows fuel bladder may be positioned in the fuel volume to expand as it is filled with liquid fuel with the translating cylindrical section or piston. A bellows pressure bladder may be positioned between the bellows fuel bladder and the module to expand as the bellows fuel bladder contracts as fuel is consumed in flight.

Figure 4A:
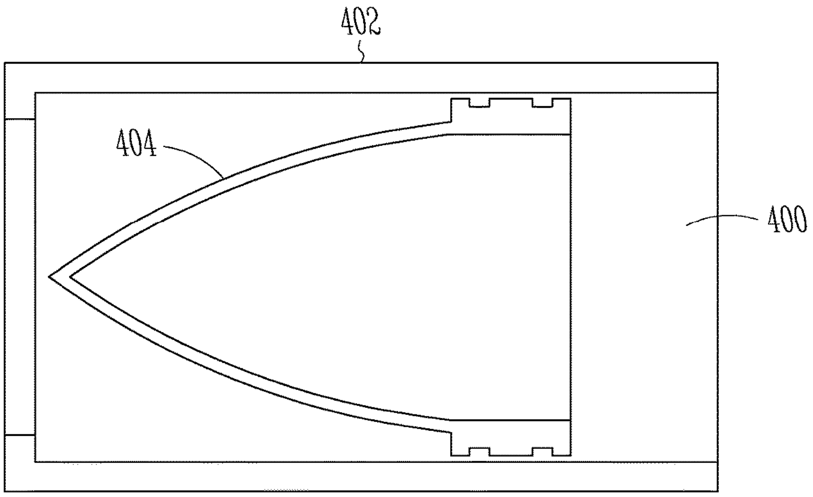
FIGS. 4A-4B are section views of an embodiment of a piston and cylinder configuration of the expandable fuel volume for an extending the missile in which the nose module is translated forward.
Figure 4B:
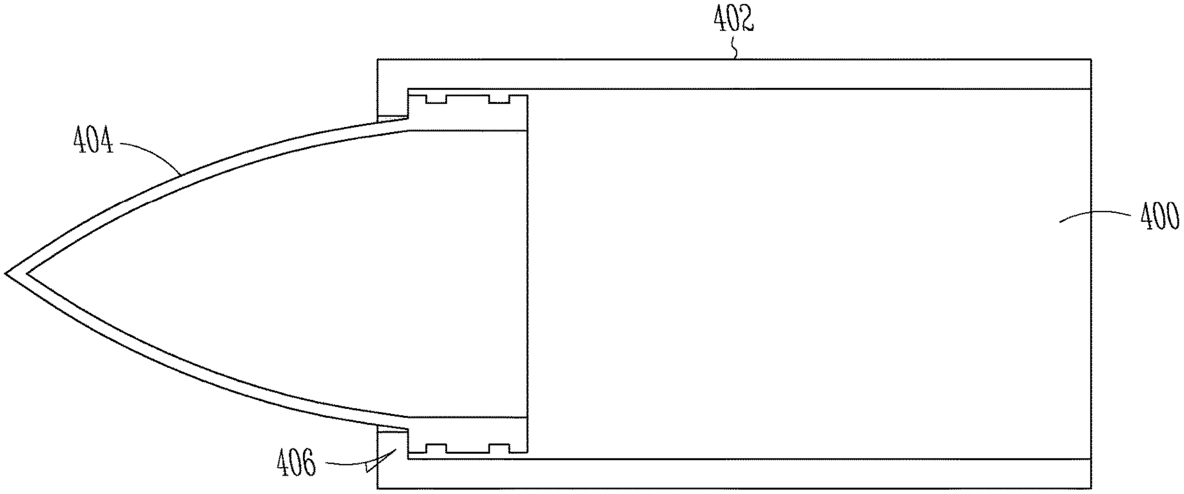

Referring now to FIGS. 4A-4B, an embodiment of an expandable fuel volume 400 for an extending missile includes a fixed cylinder 402 (e.g., the missile's mid-body section) and a translating piston 404 (e.g., the missile's nose section or axially translating cylinder). A region aft of translating piston 404 defines the expandable fuel volume 400. During storage, this region is suitably filled with fuel at 100% (no air) at a storage pressure. When liquid fuel is pumped into the region, the translating piston 404 moves forward until it contacts an extended EOT stop 406 and the pressure is raised to a higher launch pressure. The piston 404 may be held in place by the higher pressure. Alternately, a lock may be provided to engage and hold the piston 404. This particularly configuration requires the aforementioned sealing system to prevent leakage.

Figures 5A, 5B, 5C:
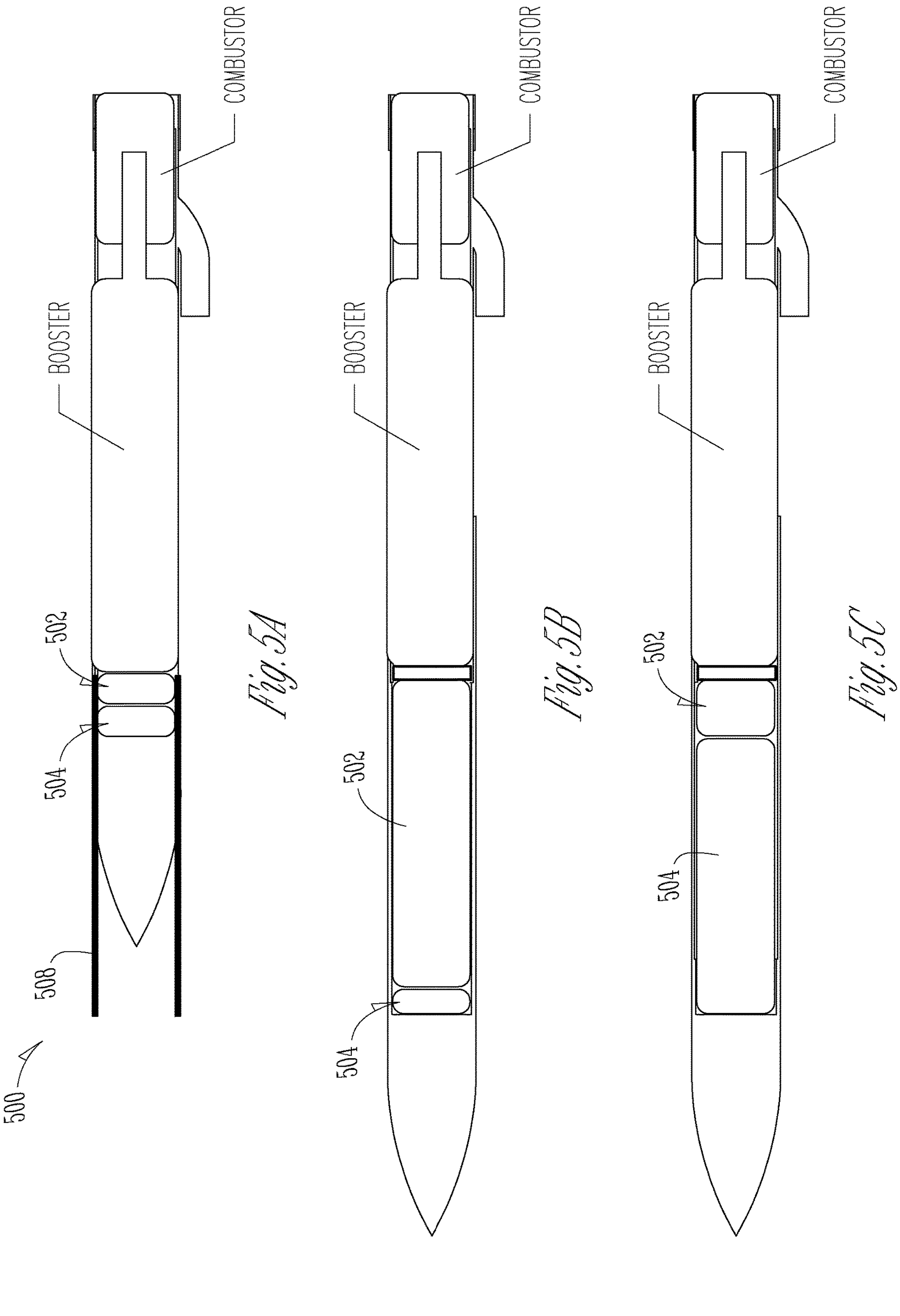
FIGS. 5A-5C are section views of an embodiment of the piston and cylinder configuration including bellows fuel and pressure bladders in the stowed, launch and end-of-flight stages.

Referring now to FIGS. 5A-5C, an embodiment of the piston and cylinder expandable fuel volume 500 may be provided with a bellows fuel bladder 502 and a bellows pressure bladder 504 positioned aft of a translating piston 506 (e.g., an axially translating cylinder) in a fixed cylinder 508. In storage, the bellows pressure bladder 504 is depressurized (collapsed) and the bellows fuel bladder 502 contains a small volume of liquid fuel at the low storage pressure. To extend the missile, liquid fuel is pumped into bellows fuel bladder 502 causing it to extend axially and push the bellows pressure bladder 504 and translating piston 506 until the extended EOT stop is contacted. As liquid fuel is consumed during flight, the bellows fuel bladder 502 and the bellows pressure bladder 504 expands. This configuration removes the need for a sealing system.

Figure 6:
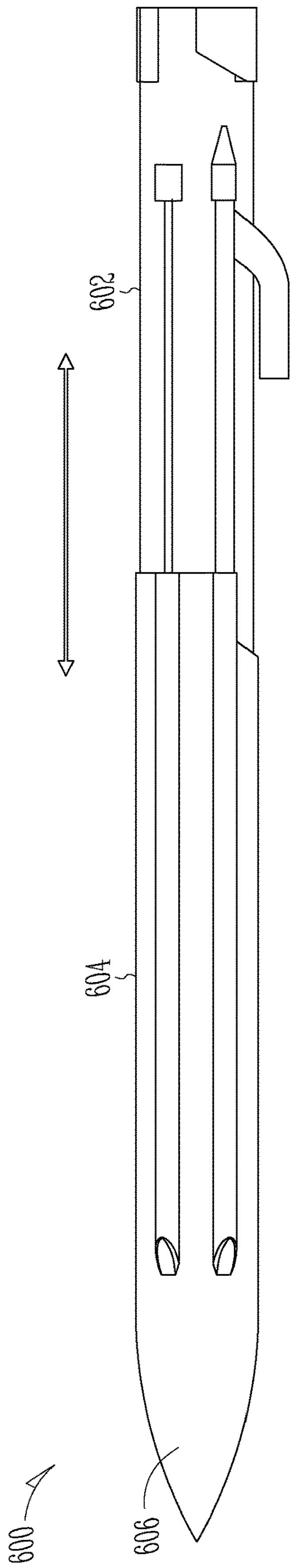
FIG. 6 is a side view of an embodiment of a telescoping cylinder configuration for an extending missile.

Referring now to FIG. 6, an embodiment of an expandable fuel volume for extending a missile 600 includes a fixed cylinder 602 and an axially translating cylinder 604 in a telescoping arrangement. The translating cylinder 604 may be either inside or outside of fixed cylinder 602. In this example, a nose section 606 is fixed to the forward end of translating cylinder 604. This telescoping arrangement can either be provided with the sealing system or the bellows fuel and pressure bladders.

Figure 7A:
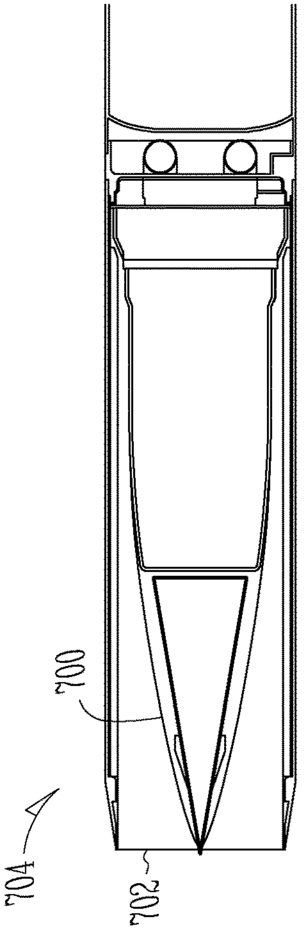
FIGS. 7A-7B are section views of an embodiment of a nested configuration of the expandable fuel volume for an extending missile in the stowed and fully extended positions.
Figure 7B:
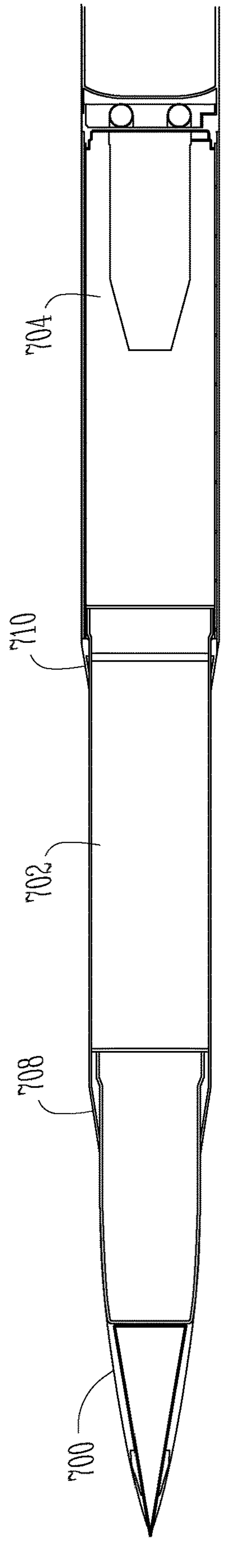

Referring now to FIG. 7, an embodiment of an expandable fuel volume for extending a missile combines both the telescoping cylinders and the piston and cylinder in a nested configuration configured to extend two times to further expand the fuel volume and extend the missiles length. As shown in its stored position, a piston 700 is retracted into a translating cylinder 702, which is retracted into a fixed cylinder 704. To extend the missile, liquid fuel is pumped into a fuel volume 706 aft of piston 700 causing the piston to translate forward until it engages an EOT stop 708. As fuel continues to be pumped into the fuel volume 706 the piston continues to move forward pulling translating cylinder 702 along until it engages an EOT stop 710.

Figures 8A, 8B:
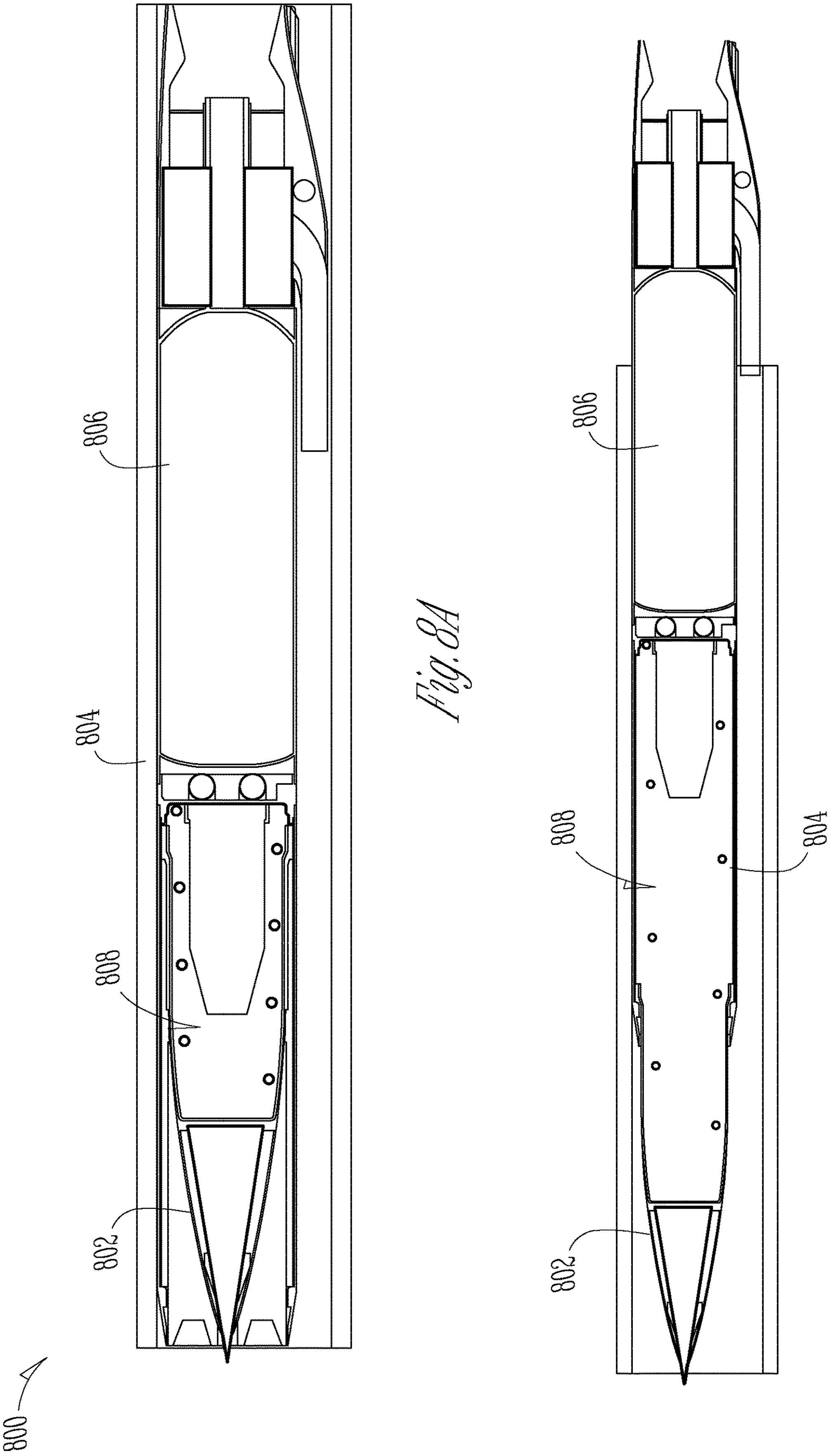
FIGS. 8A-8B are section views of an embodiment of a piston and cylinder configuration of the expandable fuel volume for an extending missile in which the booster module is translated aft.
Figure 9A:
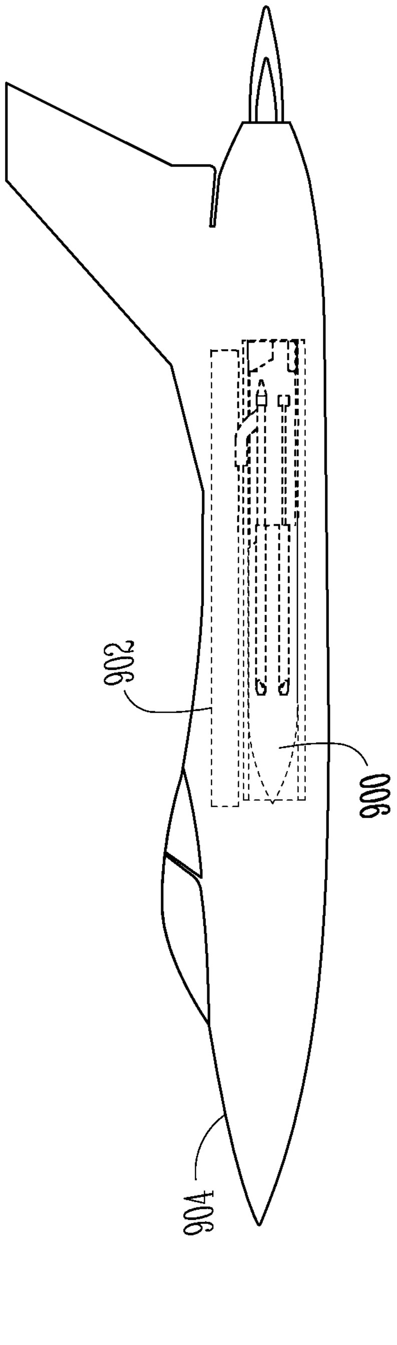
FIGS. 9A-9D illustrate an embodiment of a paired extending missile and self-contained fueling station launched from an aircraft.
Figure 9B:
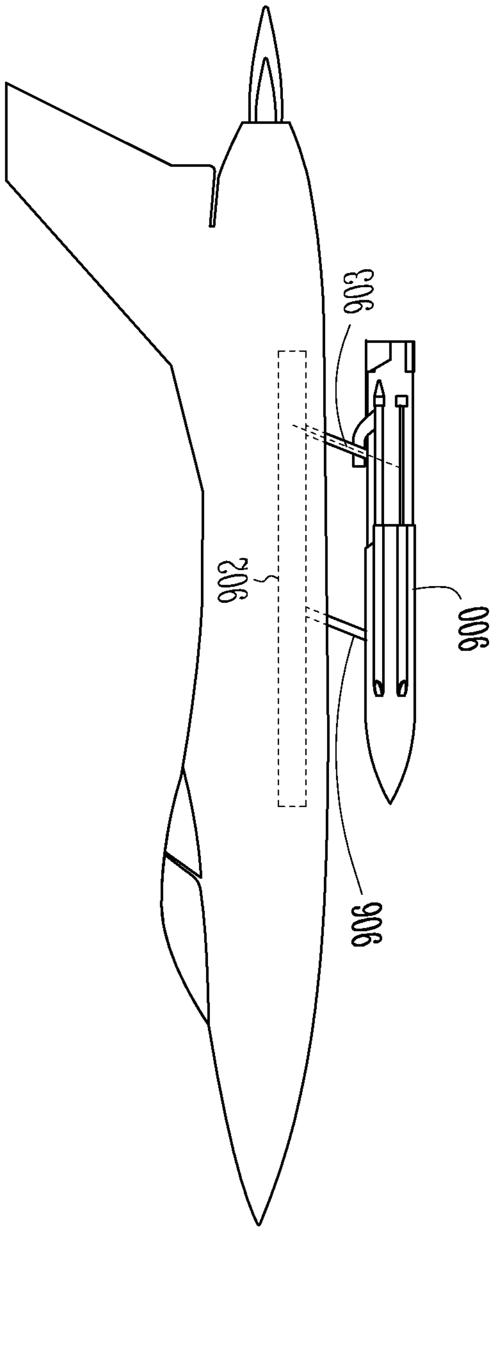
Figure 9C:
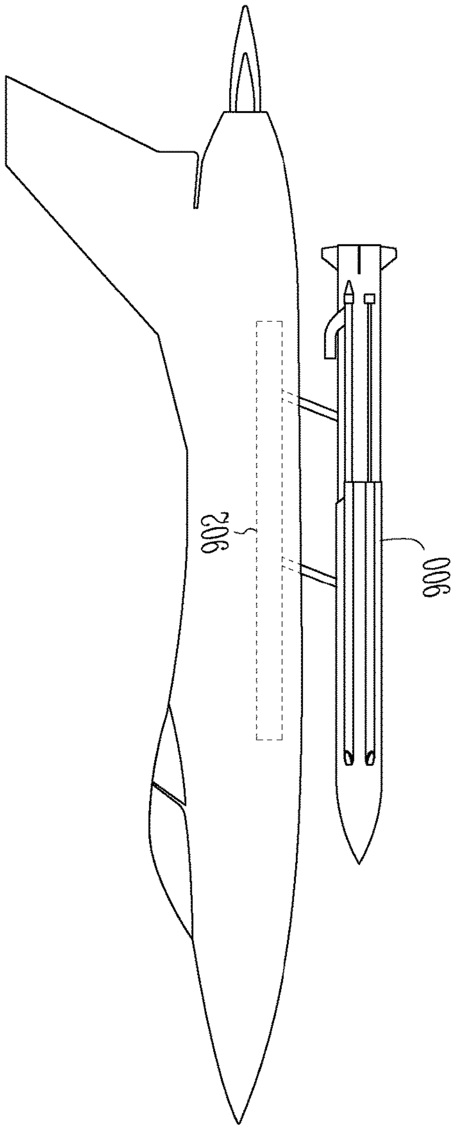
Figure 9D:
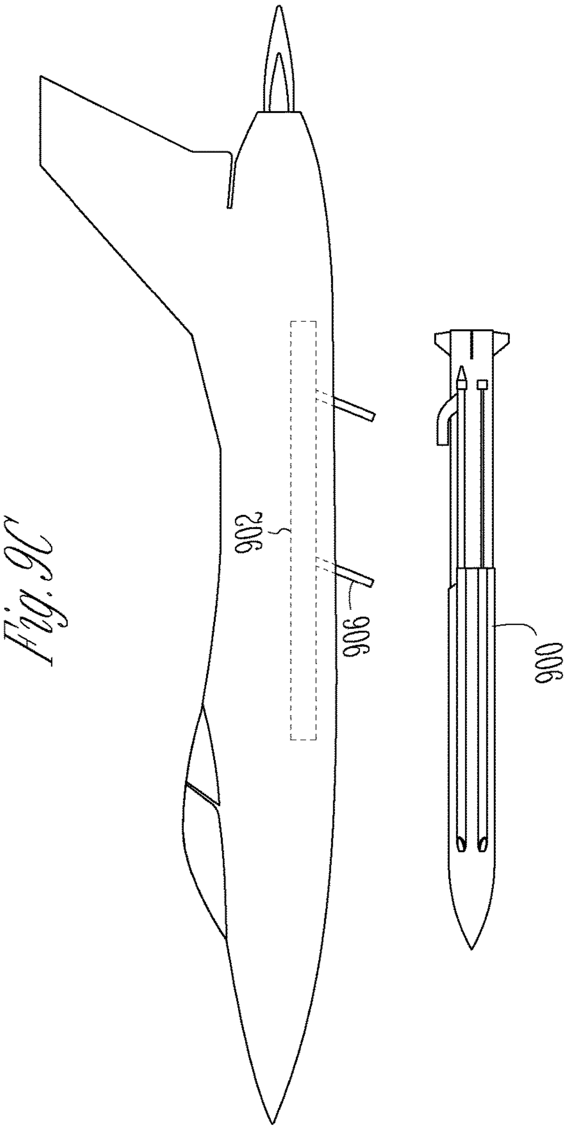

Referring now to FIGS. 8A-8B, in an embodiment of an extending missile 800, a stationary nose section 802 is fixed to a stationary mid-body section 804. A translating solid rocket motor 806 is stored in stationary mid-body section 804 with a fuel volume 808 positioned forward of translating solid rocket motor 806. When liquid fuel is pumped into fuel volume 808 the fuel volume 808 extends axially in a backward direction translating solid rocket motor 807 to extend the length of missile 800.

In different embodiments, the effector may be a munition such as ground, tube or air launched munitions such as missiles, submunitions, UAVs or drones. The airframe may be, for example, the main body, wing or rotor of the munition. The module may, for example, in the case of a missile be a nose or payload module positioned forward of the fuel volume or a solid fuel booster module positioned aft of the module. The module may be a wing section of a UAV or a rotor section of a drone.

Referring now to FIGS. 9A-9D, in an embodiment an extending missile 900 is paired with a self-contained fueling station 902 that are stowed in a cargo bay of an aircraft 904. To launch, the cargo bay doors are opened allowing push rods 906 to rotate and lower the missile. The fueling station 902 pumps liquid fuel through a fuel line 903 in at least one of the push rods 906 into the fuel volume in missile 900, which serves as an external fuel tank, to extend both the fuel volume and the missile. Once extended, the missile is dropped and the motors are ignited.

Figure 10A:
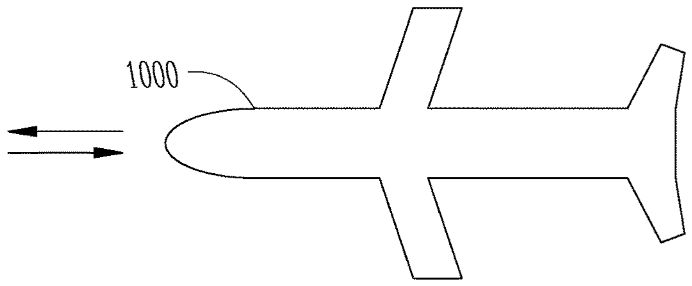
FIGS. 10A-10B, 11A-11B and 12A-12B are stowed and extended configurations for the main body of a UAV, the wings of a UAV and the rotors of a drone, respectively.
Figure 10B:
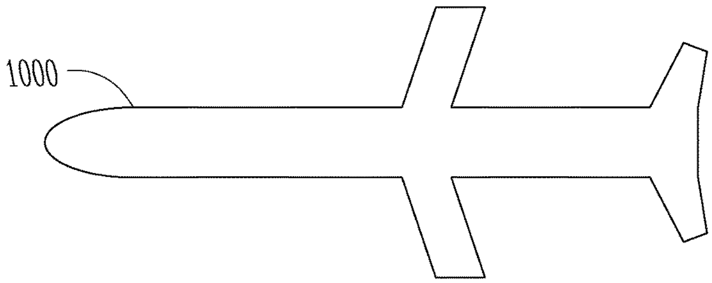

Referring now to FIGS. 10A-10B, in an embodiment a UAV 1000 is configured with an expandable fuel volume to extend the airframe along its axis.

Figure 11A:
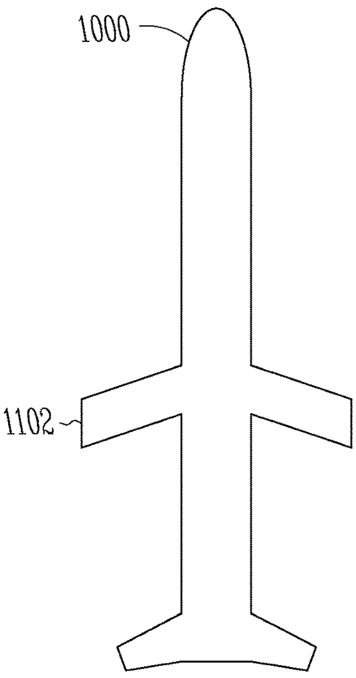
Figure 11B:
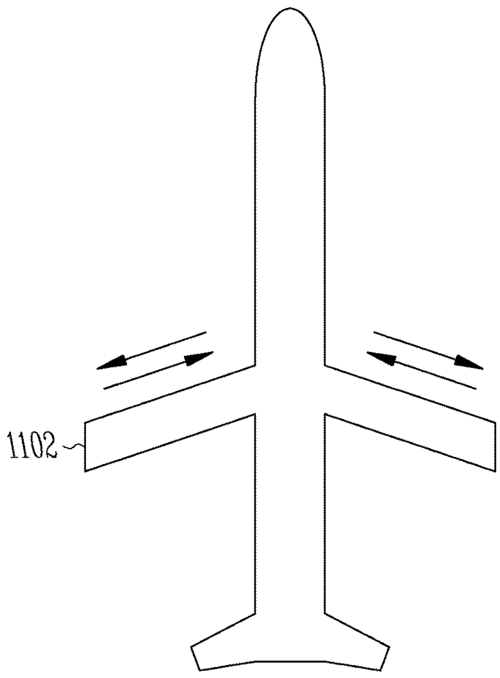

Referring now to FIGS. 11A-11B, in an embodiment a UAV 1100 is configured with an expandable fuel volume in each of its wings 1102 to extend the wings along their respective axes.

Figure 12A:
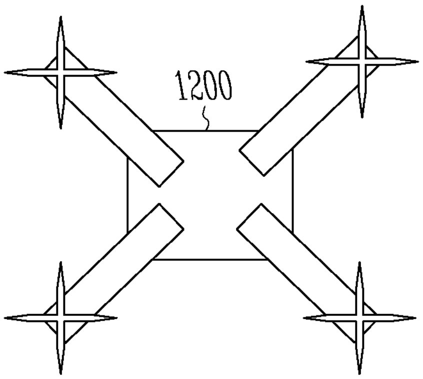
Figure 12B:
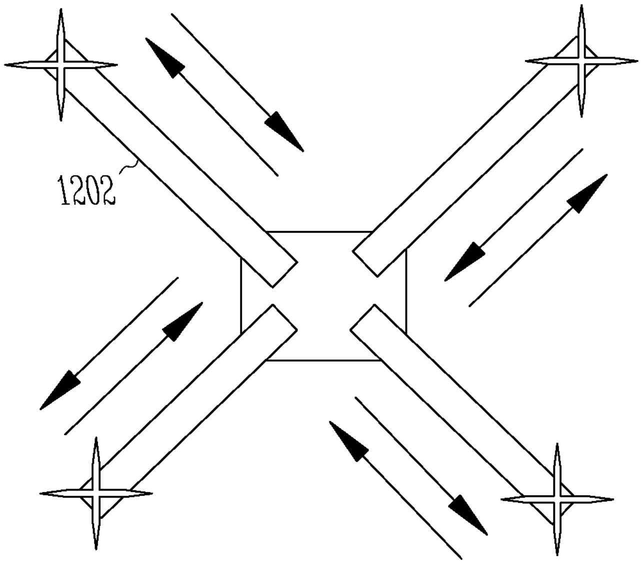

Referring now to FIGS. 12A-12B, in an embodiment a drone 1200 is configured with an expandable fuel volume in each of its rotors 1202 to extend the rotors along their respective axes.

Figure 13:
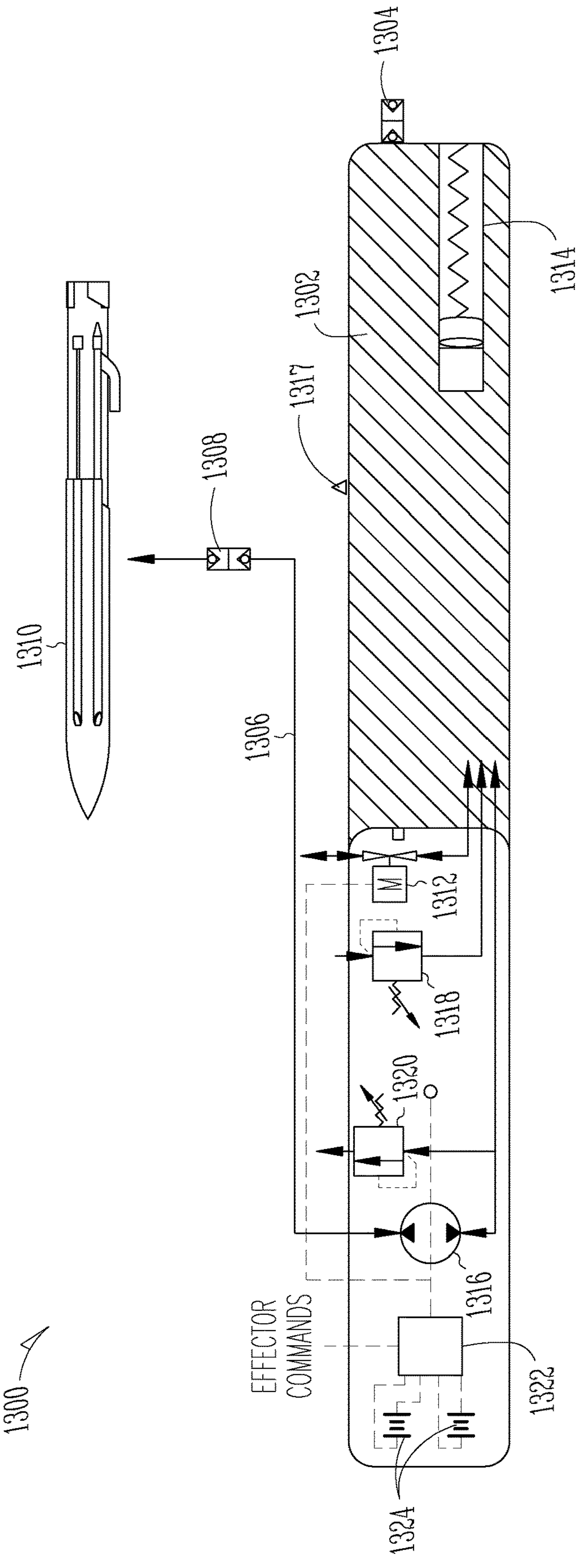
FIG. 13 is a schematic illustration of an embodiment of a self-contained fueling station paired with an extending missile.
Figure 14A:
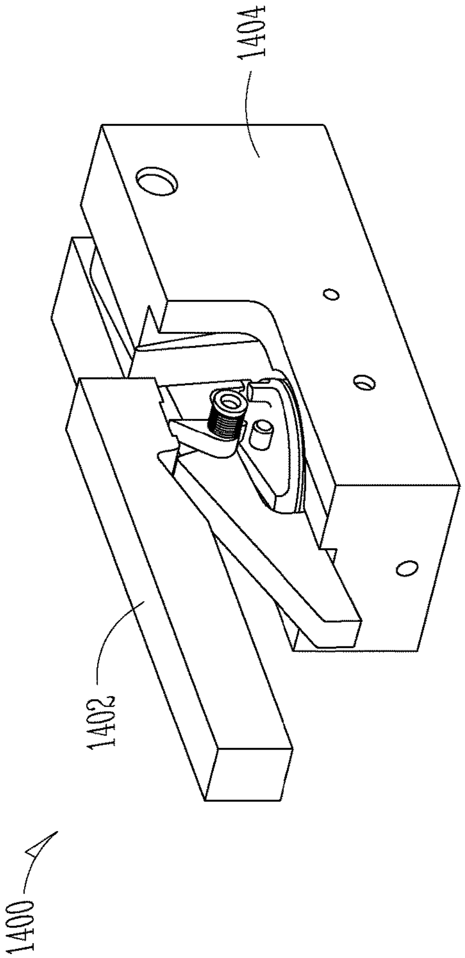
FIGS. 14A-14C are different views of an embodiment of a trigger lock for controlling the release and reset of the axially translating module.
Figure 14C:
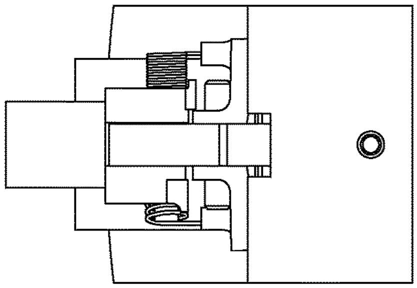
Figure 14B:
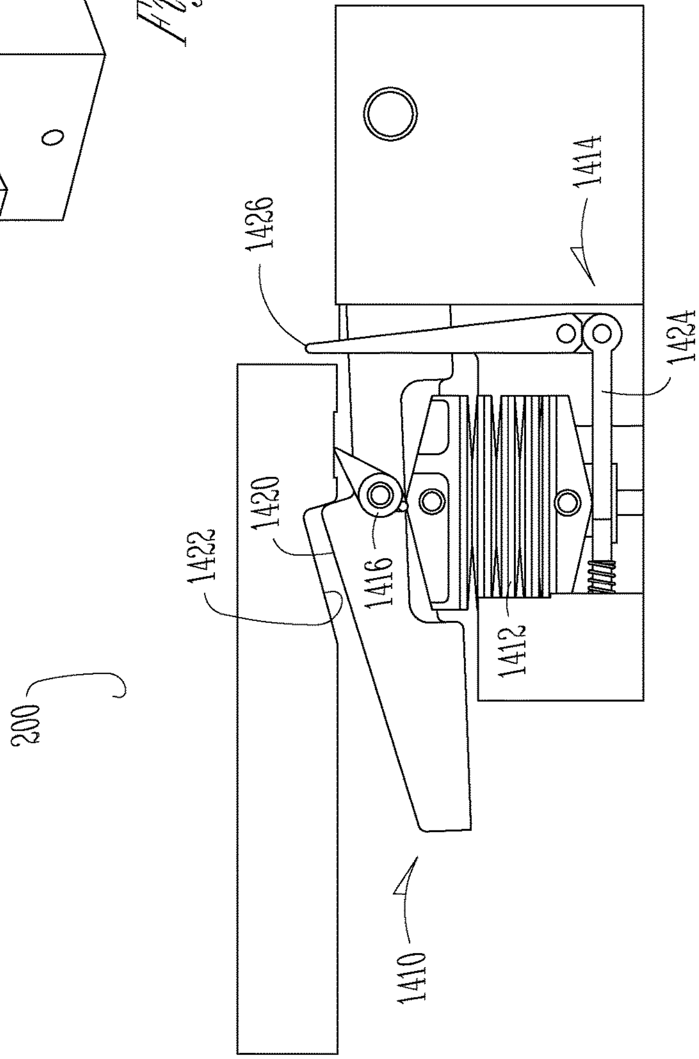

Referring now to FIG. 13, a self-contained fueling station 1300 is paired with the effector (e.g. an external fuel tank). The fueling station 1300 has a conformal shape to the effector (external fuel tank). The fueling station may be separated from the effector prior to launch, immediately at launch or carried with the effector and discarded shortly after launch, once the effector clears the launch tube.

The self-contained fueling station maintains the unexpanded fuel volume at 100% fuel (no air bubbles) at a low storage pressure e.g., 5-10 psi. Pre-launch the fueling station transfers liquid fuel to expand the effectors fuel volume to 100% fuel at a high launch pressure e.g., 100-150 psi. Upon receipt of an abort command, the fuel station transfers liquid fuel back to its internal tank to retract the effector's expandable fuel volume and module back into the airframe and returns the fuel volume to the storage pressure.

As shown, in an embodiment, self-contained fueling station 1300 includes an internal fuel tank 1302 having a fuel coupling 1304 to fill and empty the tank, a fuel line 1306 and a breakaway coupler 1308 for transferring liquid fuel to and from an effector 1310 (an external fuel tank), a bi-directional valve 1312 coupled between the internal fuel tank and the fuel line, a fuel expansion accumulator 1314 inside the internal fuel tank to compensate for fuel expansion and contraction to maintain a storage pressure within the expandable fuel volume when the bi-directional valve is on in a stowed state and a bi-directional pump 1316 positioned between the internal fuel tank and fuel line to transfer liquid fuel to and from the effector. A float valve 1317 when open allows air to be drawn into the internal fuel tank 1302. Deploy and stow unidirectional relief valves 1318 and 1320 are connected in opposing flow directions between the internal fuel tank and the fuel line. The deploy unidirectional relief valve 1318 turns on when the pressure in the effector's expandable fuel volume exceeds an operational pressure range during or after transfer of liquid fuel to the expandable fuel volume to protect the effector and turn off the pump. The stow unidirectional relieve valve 1320 turns on when pressure in the expandable fuel volume reaches the storage pressure during transfer of liquid fuel back to the internal fuel tank to protect the internal fuel tank, turn off the pump and re-open the bi-directional valve 1312 to maintain the storage pressure. A fueling controller 1322 receives effector commands and issues commands to the pump and valves to maintain storage pressure, affect fuel transfer and raise pressure for launch and to abort. Batteries 1324 power the fueling station.

When the effector and expandable fuel volume are in their retracted or stowed position, bi-directional valve 1312 is open and the bi-direction pump 1316 is off and the relief valves are effectively off. The accumulator 1314 has a designed spring force to produce a certain low storage pressure (e.g., 5-10 psi) in the expanding fuel volume and internal tank 1302 at 100% fuel (no air) to improve range and performance of the effector. If the missile cools, fuel moves the internal tank to the missile and the accumulator expands to hold pressure. If the missile heats, fuel moves from the missile to the internal tank and the accumulator expands to hold pressure. The self-contained fueling station may maintain this state for many years until the missile is extended for launch.

Prior to launch, the self-contained fueling station transfers liquid fuel from its internal tank to the missile's expanding fuel volume. The bi-directional valve 1312 is closed. One of the batteries 1324 is turned on to drive controller 1322 to turn bi-directional pump 1316 on to pump liquid fuel from internal tank 1302 to the missile to extend the missile and fill the expandable fuel volume and raise the pressure to a launch pressure of, for example, 100-150 psi. Float valve 1317 is opened to allow air into internal tank 1302 and the pressure in the tank drops to atmospheric pressure. When launch pressure is reached, deploy unidirectional relief valve 1318 is activated and sends a signal to turn off the pump. If the pressure gets too high, liquid fuel is bled out of the missile back to the internal fuel tank 1302. If the pressure drops too low, valve 1318 signals the controller to active the pump to pump fuel to the missile. If an abort command is received, the other battery 1324 is turned on to activate the bi-directional pump 1316 to transfer liquid fuel from the missile back to internal tank 1302. Float valve 1317 allows air to escape the tank as the fuel returns. The float valve 1317 is closed, which allows the pressure to rise. Once the pressure reaches the storage pressure, stow unidirectional release valve 1320 bypasses the pressure and turns the pump off return the self-contained fueling station and missile to their stowed state.

The self-contained fueling station is not limited to expanding fuel tanks for liquid fueled extending effectors. The fueling station can be paired with other fixed or expandable fuel tanks in which storage pressure must be maintained for long periods of time then raised to an operation pressure and, if circumstances dictate, returned to storage pressure.

Referring now to FIGS. 14A-14C, 15, 16A-16B, 17, 18A-18D and 19A-19C, a trigger lock 1400 is positioned to hold the translating cylindrical member 1402 (piston or cylindrical section) secure to a stationary cylindrical member 1404 until liquid fuel is transferred, to release the translating cylindrical member under sufficient pressure to expand the fuel volume and extend the effector and to reset the axially translating cylindrical member to the stationary cylindrical member. The trigger lock 1400 is configured to secure the translating cylindrical member 1402 if an axial force F1 applied to the trigger lock is less than a first threshold TH1 and to release the translating cylindrical member 1402 from the trigger lock to translate axially away from the stationary cylindrical member if the axial force F1 applied to the trigger lock exceeds TH1. The trigger lock is configured to allow the translating cylindrical member 1402 to return and reset the trigger lock if an axial force F2 applied by the translating member exceeds a second threshold TH2 where TH2<TH1. Typically, TH1 is at least 100× TH2.

In an embodiment, the trigger lock 1400 includes a retention latch 1410, a spring pack 1412, a trigger latch assembly 1414 and a spring-loaded latch clearance cam assembly 1416. The retention latch 1410 is pivotably attached to the stationary cylindrical member 1404 with the retention latch 1410 and translating cylindrical member 1402 having complementary shapes 1420 and 1422 to engage and resist axial translation. The retention latch 1410 is configured to pivot downward to disengage from the translating cylindrical member 1402 in response to the axial force F1. The spring pack 1412 is coupled between the retention latch 1410 and the stationary cylindrical member 1404 to provide a restraining force that compresses to resist the downward pivot of the retention latch 1410 to set the first threshold TH1. The trigger latch assembly 1414 includes a trigger latch 1424 configured to restrain the compressed spring pack 1412 to allow the translating member to return and once the complementary shapes 1420 and 1422 of the translating cylindrical member 1402 and retention latch 1410 are aligned and the axial force F2 provided by the translating cylindrical member engaging a latch trigger 1426 exceeds TH2 to disengage the trigger latch 1424 to release the compressed spring pack to engage the complementary shapes of the retention latch and translating cylindrical member and reset the trigger lock. The spring-loaded latch clearance cam 1416 is configured to push the retention latch 1410 away from the translating cylindrical member 1402 as the translating member disengages from the trigger lock and returns to reset the trigger lock 1400.

Figure 15:
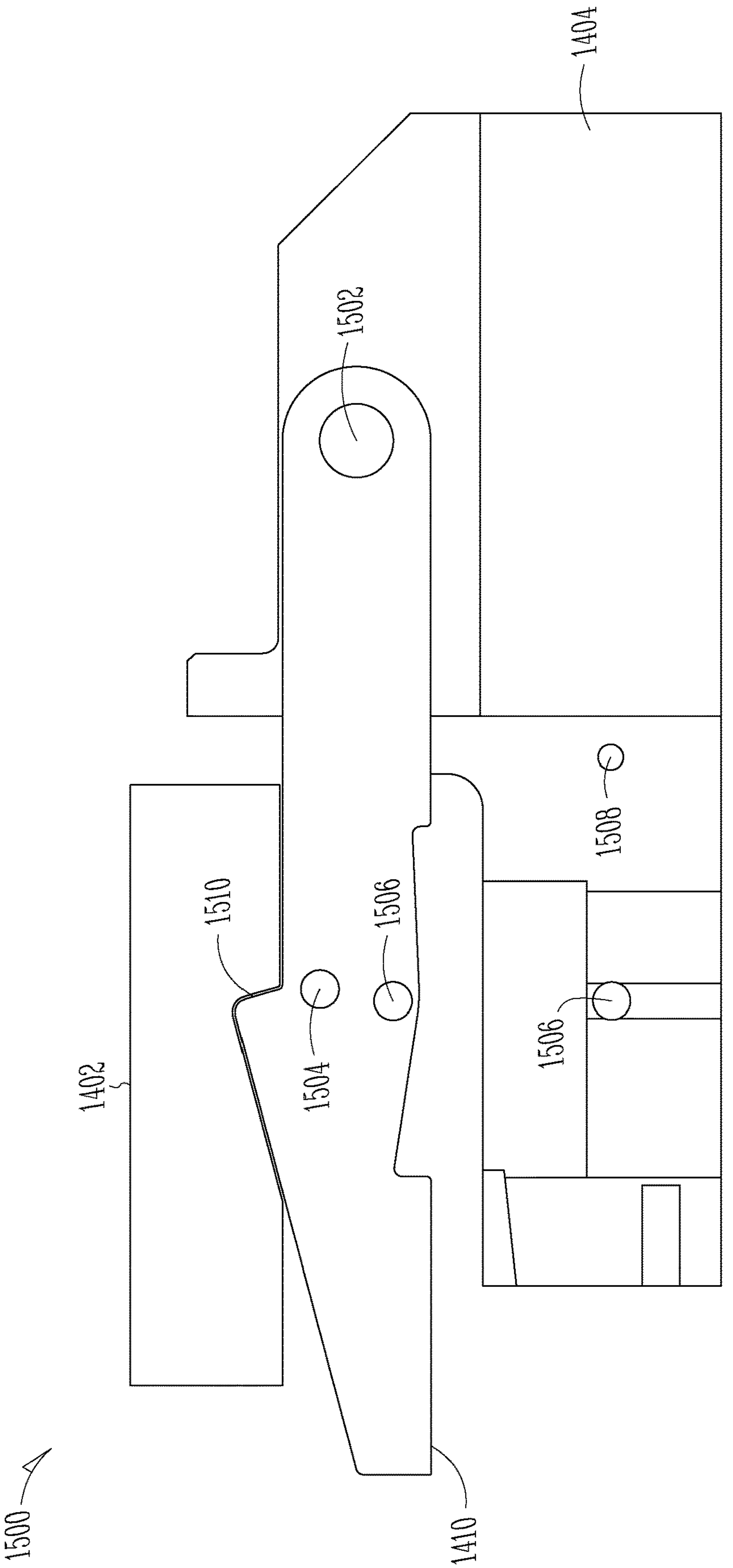
FIG. 15 is a view of an embodiment of the latch frame assembly of the trigger lock.

As shown in FIG. 15, a frame latch assembly 1500 restrains the translating cylindrical member 1402 by structurally tying it to the stationary cylindrical member 1404 and transmitting the spring pack force to restrain the translating cylindrical member. The assembly is the main structure that transmits the axially translating force to the stationary cylindrical member. The frame latch assembly 1500 includes retention latch 1410, which has a latch hinge pin 1502 for pivoting attachment to the stationary cylindrical member 1404, a clearance cam hinge location 1504 for coupling to the spring-loaded latch clearance cam 1416, a spring pack hinge pin location 1506 (a second spring pack hinge pin location 1506 and a trigger lock hinge pin location 1508 located on the stationary cylindrical member 1404). Retention latch 1410 has a back drivable ramp angle 1510 (the complementary shape 1420) that is adjustable by design to set the disengagement force threshold TH1 required for a given application.

Figure 16A:
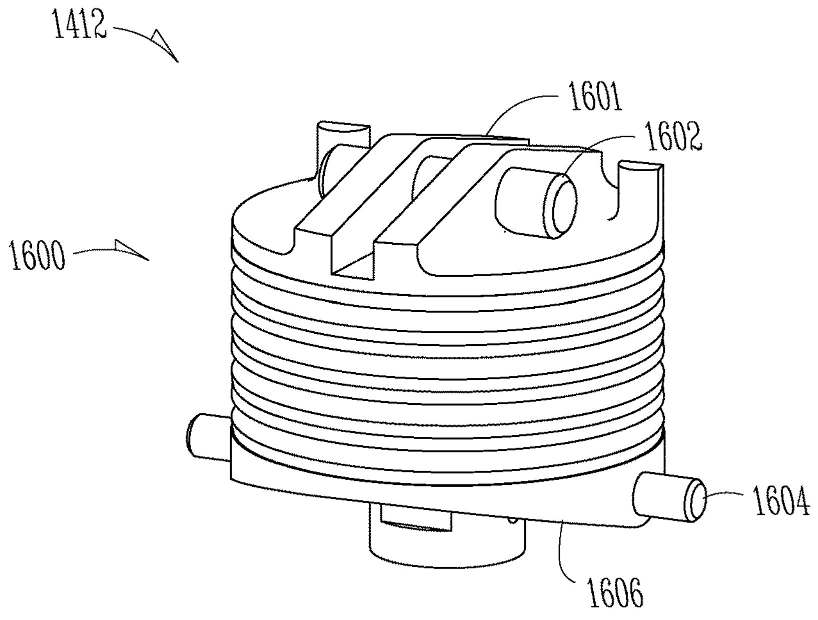
FIGS. 16A-16B are perspective and section views of the spring pack assembly of the trigger lock.
Figure 16B:
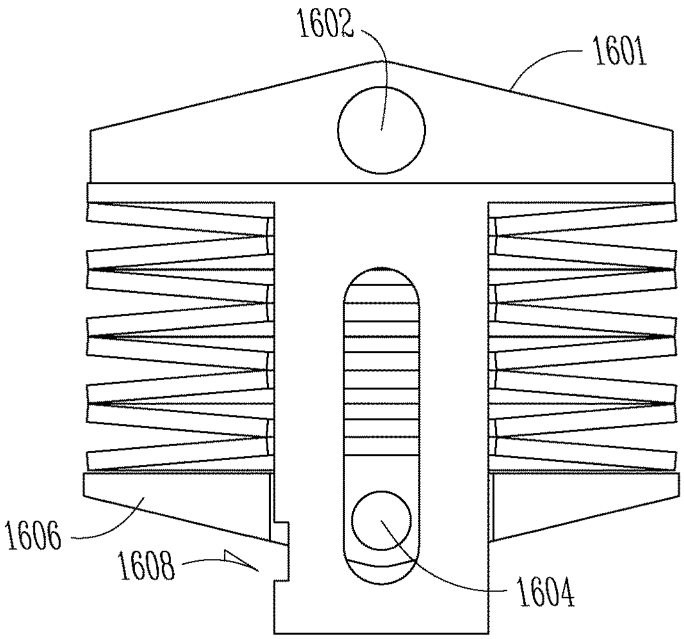

Referring now to FIGS. 16A-16B, an embodiment of spring pack 1412 includes back-to-back Bellville springs 1600 radially trapped with a spring piston 1601 and attached between the spring pack hinge pin locations 1504 shown in FIG. 15 at latch hinge pin 1602 and latch frame pin 1604 to limit axial travel to produce an initial spring preload. A guide plate 1606 is positioned to axially trap the springs 1600, guide the spring piston 1601 and transmit force to the stationary cylindrical member. A spring retention trigger notch 1608 axially restrains the spring pack in its compressed position and the retention latch away from the translating cylindrical member when extended.

Figure 17:
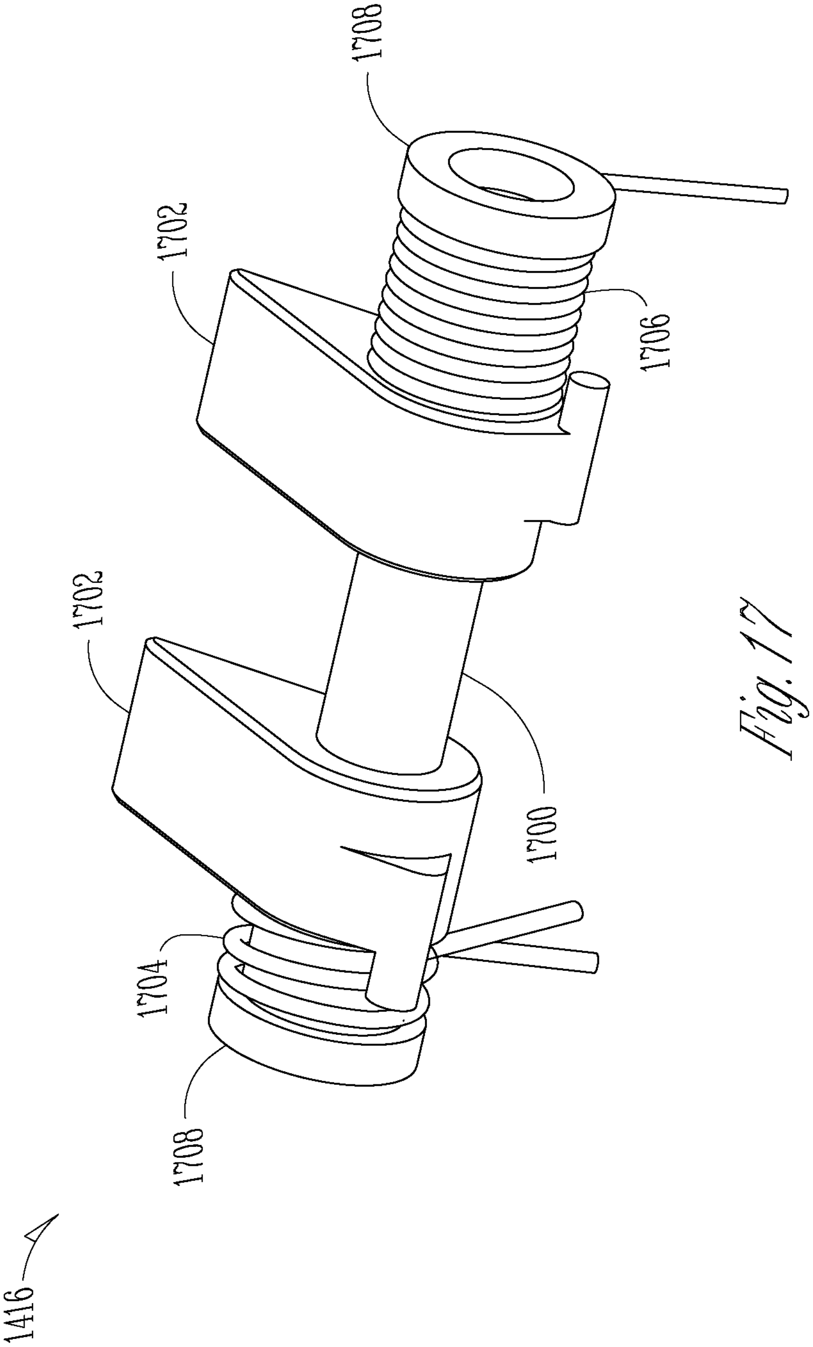
FIG. 17 is a view of an embodiment of the spring-loaded latch clearance cam assembly of the trigger lock.
Figure 18A:
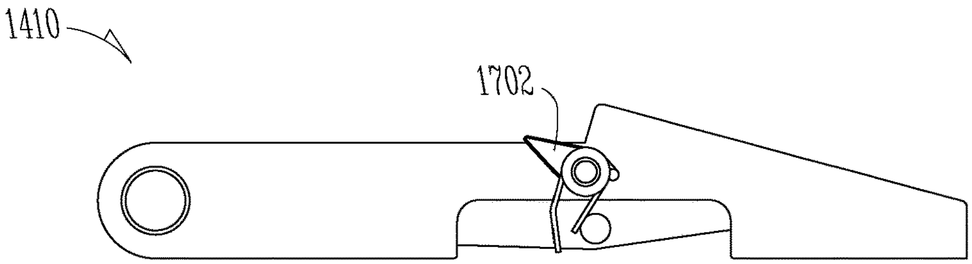
FIGS. 18A-18D illustrate the positioning of the cam in its stowed, translating and reset positions.
Figure 18B:
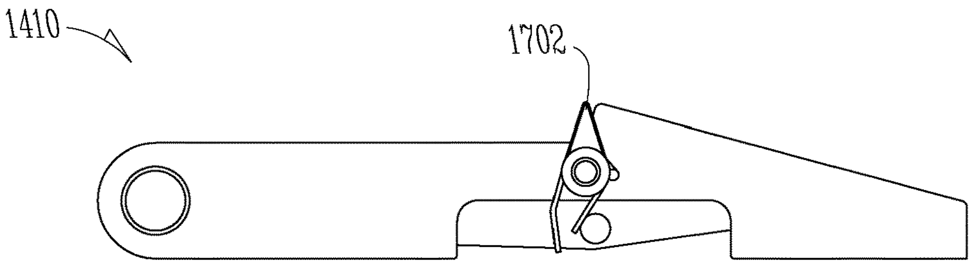
Figure 18C:
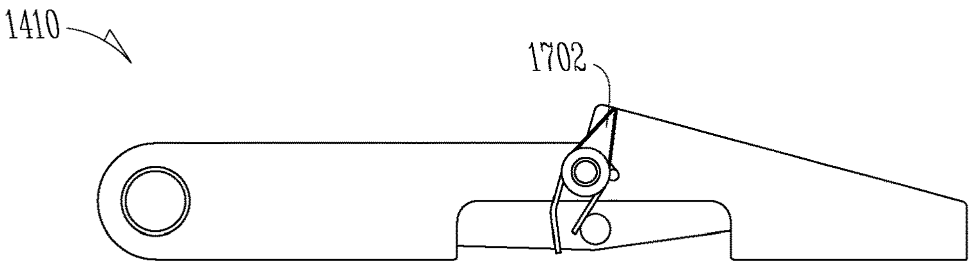
Figure 18D:
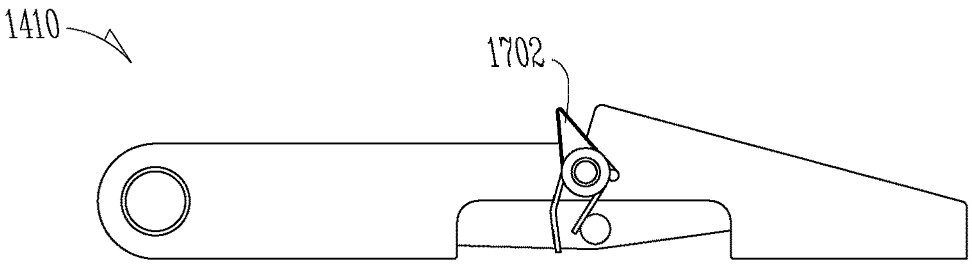

Referring now to FIG. 17, an embodiment of spring-loaded latch clearance cam assembly 1416 includes a cam shaft 1700, a pair of cams 1702, a cam position spring 1704, an engagement spring 1706 and spring mandrels 1708 to capture the springs on the cam shaft. The cams 1702 are aligned and fixed to the cam shaft to allow them to rotate as a set. The cams push the retention latch 1410 away from the translating cylindrical member to release or reset the trigger lock. The cam position spring 1704 holds the cams in position to engage the translating cylindrical member, limits travel of the engagement spring 1706 and allows the cams to rotate during deployment. The engagement spring 1706 maintains a light cam force on the translating cylindrical member.

Figure 19A:
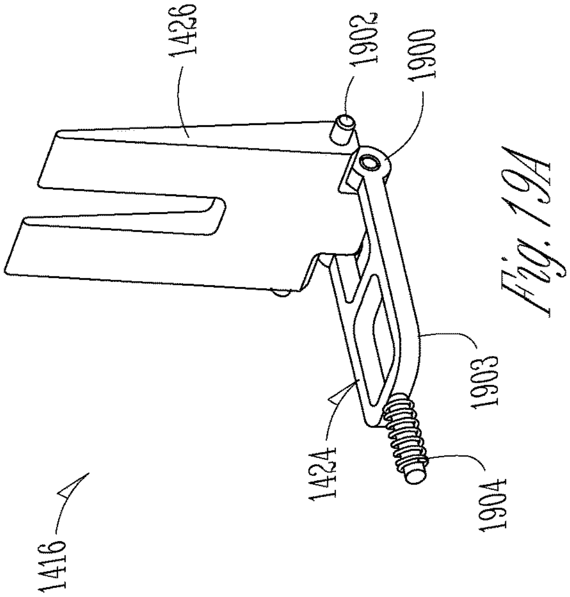
FIGS. 19A-19C are different views of the trigger latch assembly of the trigger lock.
Figure 19B:
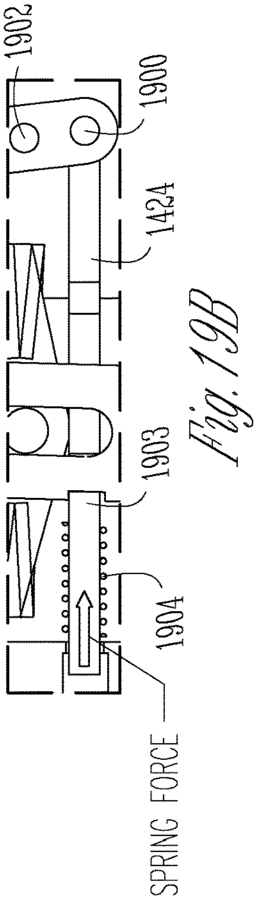
Figure 19C:
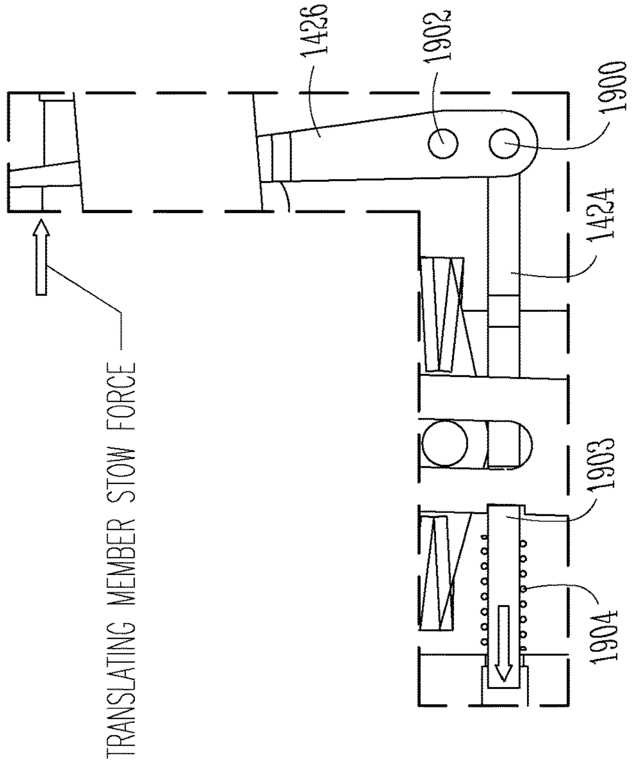

As shown in FIGS. 18A-18D, the spring-loaded clearance cam assembly 1416 pushes the retention latch 1410 away from the translating member driving the spring pack to a compressed position allowing the trigger lock to restrain the spring pack and retention latch clear of the translating member for re-engagement operation. The cams are fixed to the shaft to move as one unit with the cam position spring 1704 driving the assembly clockwise to engage the translating member and the stiffer engagement spring 1706 that holds the cam position spring 1704 in its reset position and deflects under the translating airframe extension forces. Once the translating member disengages from the latch assembly the engagement spring 1706 drives the cam assembly back to its position to accept the translating member if it reengages with the lock assembly Referring now to FIGS. 19A-19C, an embodiment of trigger latch assembly 1414 includes trigger latch 1424 and latch trigger 1426 that are connected by a latch-to-trigger hinge 1900. A latch trigger hinge 1902 on latch trigger 1426 is coupled to trigger lock hinge pin location 1508 on the stationary cylindrical member and allows the latch trigger 1426 to pivot. An engagement surface 1903 of trigger latch 1424 engages and disengages the spring retention trigger notch 1608 to restrain and release the spring pack to engage the retention latch to the translating cylindrical member or to restrain the spring pack from engagement. A trigger latch spring 1904 pushes the trigger latch 1424 into the spring retention trigger notch 1608 to restrain the spring pack assembly. Latch trigger 1426 provides a mechanical lever to reduce the force on the translating cylindrical member to a low threshold TH2 to stow and reset the trigger. As shown in FIG. 19B, the trigger latch spring 1904 engages the trigger latch 1424 into the spring retention trigger notch 1608 to restrain the retention latch from engaging the translating cylindrical member. As shown in FIG. 19C, trigger latch spring 1904 disengages the trigger latch 1424 from the spring retention trigger notch 1608 to release the trigger latch to engage the translating cylindrical member.

In the stowed position, the spring pack 1412 exerts an upward force to engage and hold the complementary shapes of the translating cylindrical member 1402 and the retention latch 1410 to secure the translating cylindrical member. As the pressure in the expanding fuel volume increases, at about 10-20 psi, the translating cylindrical member 1402 will load the retention latch 1410 and start to drive it open. As the translating cylindrical member moves, the cam engages the member and starts to push the retention latch down and compresses the spring pack. As the retention latch is driven downward, the cam rotates to drive the retention latch further away from the translating cylindrical member and sets the trigger latch in the spring retention trigger notch 1608 and positions the latch trigger. A pressure of approximately 10-20 psi is required to exceed the TH1 to release the translating cylindrical member. The trigger maintains this configuration until the translating cylindrical member returns (i.e., an abort command is issued to retract the extended missile). On return, the translating cylindrical member pushes the latch trigger, which pivots to move the trigger latch forward out of the spring retention trigger notch 1608, which releases the spring pack which exerts an upward force to engage and hold the complementary shapes of the translating cylindrical member and the retention latch to secure the translating cylindrical member. A force of 2 lbf is required to exceed TH2 and reset the trigger, at least 100× less than TH1.

Figure 20:
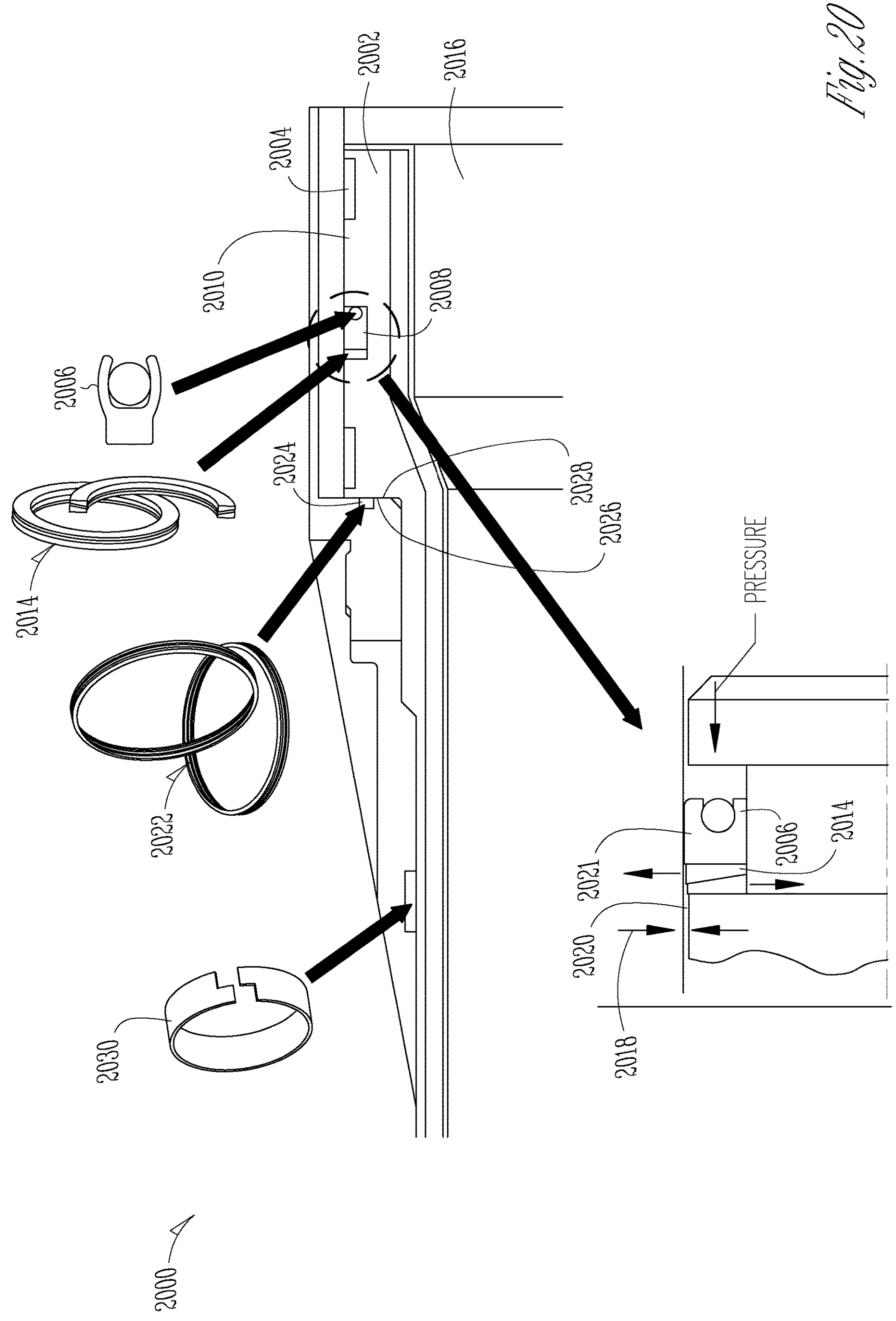
FIG. 20 is a section view of the piston and cylinder at the extended EOT illustrating the sealing system.

Referring now to FIG. 20, an embodiment of a sealing system 2000 prevents leakage of the liquid fuel between a piston 2002 and stationary cylinder 2004 in the stowed, extending and EOT stages. A piston seal 2006 is positioned in a groove 2008 formed in the piston wall (or cylinder wall) at an annular interface 2010 between the piston 2002 and the stationary cylinder 2004 to provide the primary seal. The piston seal is a type of hydraulic seal that is exposed to movement on its outer diameter along the cylinder. A hydraulic seal is a relatively soft, non-metallic ring, captured in a groove forming a scaling assembly to block or separate fluid in reciprocating motion application. The piston seal is formed from materials such as polymers, rubber or polytetrafluoroethylene (PTFE) whose temperature rating is lower than expected operating temperatures. These materials are required to provide the requisite scaling in translating piston/cylinder configurations. Exposure to temperatures above the rated temperature can cause the piston seal to liquify and escape allowing the liquid fuel to leak. A primary back-up seal is provided by a pair of opposing wedge-shaped backup rings 2014 positioned forward of the piston seal 2006 in the groove 2008. Pressure in an expandable fuel volume 2016 exerted on the piston seal 2006 produces a force that drives the pair of opposing wedge-shaped backup rings 2014 axially together against a wedge angle, which drives the pair of wedge-shaped backup rings radially apart to close a gap 2018 across the annular interface 2010 and generate a torturous flow path 2020 that resists the flow of liquified material 2021. A secondary back-up is provided by a metal face seal 2022 positioned in a groove at an extended end of travel (EOT) stop 2024 (e.g., a backward-facing portion 2026 of the stationary cylinder and a forward-facing portion 2028 of the piston) that provides an additional seal at the extended EOT to prevent the flow of liquified material from leaking out. Multiple glide ring seals 2030 are suitably spaced along the length of the annular interface to separate the metal piston and metal cylindrical section prevent Galling.

As applied to the effector's expandable fuel volume, when in a stowed configuration, piston seal 2006 provides the requisite sealing when both temperature and pressure are low. When liquid fuel is transferred to expand and pressure the fuel volume, the wedge-shaped backup rings 2014 are driven radially apart to close the gap. This occurs during expansion prior to aerodynamic heating and is held by pressure during flight. The metal face seal 2022 at the extended EOT is also engaged prior to launch.

In a particular instantiation of this embodiment, piston seal 2006 is a Parker FBN-H Profile seal composed of fiberglass filled PTFE that is energized with multiple SS302 Garter-springs with a temperature range of −250° F. to 575° F. Operating temperatures due to aerodynamic heating may reach or exceed 750° F. The wedge-shaped backup rings 2014 are composed of bronze-filled PTFE energized with multiple SS301 Garter-springs with a temperature range of −129° F. to 575° F. The metal face seal 2022 is a hard stop face seal composed of Inconel 718 with a temperature range of −350° F. to 1000° F. Glide ring seals 2030 are 3×PEEK Carbon, Graphite, PTFE filled glide rings having a compressive strength 21 of 700 psi with a temperature range of −200° F. to 500° F.

While several illustrative embodiments of the disclosure have been shown and described, numerous variations and alternate embodiments will occur to those skilled in the art. Such variations and alternate embodiments are contemplated, and can be made without departing from the spirit and scope of the disclosure as defined in the appended claims.

We claim:

1. A self-contained fueling station for fueling an external fuel tank, comprising:
- an internal fuel tank configured to hold liquid fuel;
- a fuel line for transferring liquid fuel to and from the external fuel tank;
- a bi-directional storage valve;
- a fuel expansion accumulator inside the internal fuel tank configured to maintain a storage pressure within the external fuel tank when the bi-directional storage valve is open in a stored state;
- a bi-directional pump configured to transfer liquid fuel between the internal fuel tank and the external fuel tank; and
- unidirectional deploy and stow relief valves connected in opposing flow directions between the internal fuel tank and the flow line,
- in a fuel-transfer state, said bi-directional pump transfers liquid fuel to the external fuel tank, said deploy relief valve configured to relieve pressure in the external fuel tank and turn off the bi-directional pump when the pressure in the external fuel tank exceeds an operational pressure,
- in a stow state, said bi-directional pump transfers liquid fuel to the internal fuel tank, said stow relieve valve configured to relieve pressure in the internal fuel tank, turn off the bi-directional pump and open the bi-directional storage valve when the pressure in the internal fuel tank reaches the storage pressure to return to the stored state.

2. The self-contained fueling station of claim 1, wherein the operational pressure is at least 10× the storage pressure.

3. The self-contained fueling station of claim 1, wherein the fuel expansion accumulator maintains 100% liquid fuel in the external fuel tank.

4. The self-contained fueling station of claim 1, further comprising:
- a float valve coupled to the internal fuel tank,
- wherein in said storage mode said float valve is closed,
- wherein in said fuel-transfer state, said float valve is opened to allow air to be drawn into the internal fuel tank whose pressure drops to atmosphere and then closed when transfer is complete, and
- wherein in the stow state, said valve is open to allow air to leave the internal fuel tank as liquid fuel returns and then closed to allow the pressure in the internal fuel tank to rise.

5. The self-contained fueling station of claim 1, further comprising:
- one or more batteries to power the self-contained fueling station.

6. The self-contained fueling station of claim 1, further comprising:
- a fueling controller configured to receive external commands as to the storage, fuel-transfer and stow states and to issue commands to the bi-directional storage valves, bi-directional pump and deploy and stow relive valves to implement the storage, fuel-transfer and stow states.

7. The self-contained fueling station of claim 1, wherein the external fuel tank has an expandable volume.

8. The self-contained fueling station of claim 7, wherein the external fuel tank comprises first and second cylindrical sections that extends axially to expand the volume.

9. The self-contained fueling station of claim 1, wherein the fueling station is uniquely paired with the external fuel tank.

10. The self-contained fueling station of claim 1, wherein the self-contained fueling station has a conformal shape to the external fuel tank.

11. The self-contained fueling station of claim 10, wherein the self-contained fueling station separates from the external fuel tank.

12. The self-contained fueling station of claim 11, further comprising:
- a plurality of push rods configured to rotate the fueling station away from the external fuel tank and then drop the self-contained fueling station.

13. The self-contained fueling station of claim 12, wherein liquid fuel is transferred in the fuel line through at least one of the push rods.

14. A self-contained fueling station for fueling an external fuel tank configured to expand axially, said self-contained fueling station comprising:
- an internal fuel tank configured to hold liquid fuel;
- a fuel line for transferring liquid fuel to and from the external fuel tank to extend and retract the external fuel tank;
- a bi-directional storage valve;
- a fuel expansion accumulator inside the internal fuel tank configured to maintain a storage pressure within the external fuel tank when the bi-directional storage valve is open in a stored state;
- a bi-directional pump configured to transfer liquid fuel between the internal fuel tank and the external fuel tank to extend the external fuel tank; and unidirectional deploy and stow relief valves connected in opposing flow directions between the internal fuel tank and the flow line, in a fuel-transfer state, said bi-directional pump transfers liquid fuel to the external fuel tank, said deploy relief valve configured to relieve pressure in the external fuel tank and turn off the bi-directional pump when the external fuel tank is fully extended and the pressure in the external fuel tank exceeds an operational pressure, in a stow state, said bi-directional pump transfers liquid fuel to the internal fuel tank to retract the external fuel tank, said stow relieve valve configured to relieve pressure in the internal fuel tank, turn off the bi-directional pump and open the bi-directional storage valve when the pressure in the internal fuel tank reaches the storage pressure to return to the stored state.

15. The self-contained fueling station of claim 14, wherein the operational pressure is at least 10× the storage pressure.

16. The self-contained fueling station of claim 14, further comprising:

a float valve coupled to the internal fuel tank, wherein in a storage mode said float valve is closed, wherein in said fuel-transfer state, said float valve is opened to allow air to be drawn into the internal fuel tank whose pressure drops to atmosphere and then closed when transfer is complete, and wherein in the stow state, said float valve is open to allow air to leave the internal fuel tank as liquid fuel returns and then said float valve is closed to allow the pressure in the internal fuel tank to rise.

17. The self-contained fueling station of claim 14, wherein the self-contained fueling station is uniquely paired with and has a conformal shape to the external fuel tank.

18. The self-contained fueling station of claim 17, further comprising:

a plurality of push rods configured to rotate the fueling station away from the external fuel tank and then drop the self-contained fueling station.

19. The self-contained fueling station of claim 18, wherein liquid fuel is transferred in the fuel line through at least one of the push rods.

* * * * *